(12) United States Patent
Lönnerdal et al.

(10) Patent No.: US 11,647,777 B2
(45) Date of Patent: May 16, 2023

(54) NUTRITIONAL COMPOSITION

(71) Applicant: Semper AB, Sundbyberg (SE)

(72) Inventors: Bo Lönnerdal, Davis, CA (US); Olle Hernell, Umeå (SE); Lars-Börje Sjöberg, Vallentuna (SE); Catharina Tennefors, Enebyberg (SE)

(73) Assignee: Semper AB, Sundbyberg (SE)

( * ) Notice: Subject to any disclaimer, the term of this patent is extended or adjusted under 35 U.S.C. 154(b) by 0 days.

(21) Appl. No.: 15/244,304

(22) Filed: Aug. 23, 2016

(65) Prior Publication Data

US 2017/0013869 A1    Jan. 19, 2017

Related U.S. Application Data

(63) Continuation of application No. 14/391,494, filed as application No. PCT/EP2013/057405 on Apr. 9, 2013, now abandoned.

(30) Foreign Application Priority Data

Apr. 10, 2012 (SE) .................................. 1250357-9

(51) Int. Cl.
*A23L 33/00* (2016.01)
*A23L 33/12* (2016.01)
(Continued)

(52) U.S. Cl.
CPC ............... *A23L 33/30* (2016.08); *A23L 33/12* (2016.08); *A23L 33/17* (2016.08); *A23L 33/18* (2016.08); *A23L 33/40* (2016.08); *A23V 2002/00* (2013.01)

(58) Field of Classification Search
CPC .......... A23L 33/30; A23L 33/12; A23L 33/18; A23L 3/40
See application file for complete search history.

(56) References Cited

U.S. PATENT DOCUMENTS 6,136,858 A * 10/2000 Kuchan .................. A23L 33/13
426/607
8,119,142 B2   2/2012 Zwijsen et al.
(Continued)

FOREIGN PATENT DOCUMENTS

EA        011075 B1    12/2008
EP       1841330 B1    10/2007
(Continued)

OTHER PUBLICATIONS

"Cream" http://www.thestudentchef.com/cream/ accessed on (Feb. 3, 2017), pp. 1.*
(Continued)

*Primary Examiner* — W A Moore
(74) *Attorney, Agent, or Firm* — Fish & Richardson P.C.

(57) ABSTRACT

A nutritional composition having a total energy content of 67 kcal/100 ml or lower and including: a protein content which is 1.25 g/100 ml or lower, an energy content from protein of 7.2-8.4% of the total energy content of the nutritional composition, an energy content from fat which is at least 49% or more of the total energy content of the nutritional composition, a medium chain fatty acid content comprising 8 to 10 carbons which is less than 3 wt % of total amount of fatty acids, a sialic acid content of 10-25 mg/100 ml, a cholesterol content of 5-10 mg/100 ml, and a sphingomyelin content of 9-15 mg/100 ml is disclosed.

16 Claims, 2 Drawing Sheets

(51) Int. Cl.
A23L 33/18 (2016.01)
A23L 33/17 (2016.01)

(56) References Cited

U.S. PATENT DOCUMENTS

| | | | |
|---|---|---|---|
| 2004/0202765 A1 | 10/2004 | McMahon et al. | |
| 2004/0265462 A1 | 12/2004 | Carlson | |
| 2005/0096295 A1 | 5/2005 | McMahon et al. | |
| 2005/0175759 A1 | 8/2005 | Singhal | |
| 2008/0000330 A1 | 1/2008 | Basler et al. | |
| 2008/0003330 A1 | 1/2008 | Rueda et al. | |
| 2008/0064635 A1 | 3/2008 | Rueda et al. | |
| 2008/0145475 A1* | 6/2008 | Flatt | A23L 33/12 426/2 |
| 2009/0186803 A1 | 7/2009 | Zwijsen et al. | |
| 2010/0068149 A1 | 3/2010 | Zwijsen et al. | |
| 2010/0104727 A1* | 4/2010 | Gonzalez | A23L 33/19 426/588 |
| 2010/0298273 A1* | 11/2010 | Bar Yosef | A61P 3/00 514/114 |
| 2010/0316619 A1* | 12/2010 | Wittke | A23L 33/40 424/93.45 |
| 2013/0095204 A1* | 4/2013 | Jouni | A23L 33/12 426/2 |
| 2015/0079225 A1 | 3/2015 | Lönnerdal et al. | |

FOREIGN PATENT DOCUMENTS

| | | | | |
|---|---|---|---|---|
| EP | 1932437 | | 6/2008 | |
| EP | 2258218 A1 | | 12/2010 | |
| EP | 2589302 | | 5/2013 | |
| GB | 1353096 A | * | 5/1974 | A23C 9/20 |
| JP | H05-30903 | | 2/1993 | |
| RU | 2414905 C2 | | 3/2011 | |
| WO | WO 2004/093557 | | 11/2004 | |
| WO | WO 2005/000040 | | 1/2005 | |
| WO | WO 2006/069918 A1 | | 7/2006 | |
| WO | WO 2007/073192 A2 | | 6/2007 | |
| WO | WO 2007/073193 | | 6/2007 | |
| WO | WO 2007/108690 A1 | | 9/2007 | |
| WO | WO 2008/005862 A2 | | 1/2008 | |
| WO | WO 2008/005869 | | 1/2008 | |
| WO | WO 2009/051502 | | 4/2009 | |
| WO | WO 2009/082214 A1 | | 7/2009 | |
| WO | WO 2009/138680 | | 11/2009 | |
| WO | WO 2010/027258 A1 | | 3/2010 | |
| WO | WO 2010/027259 | | 3/2010 | |
| WO | WO-2010068105 A1 | * | 6/2010 | A23L 33/115 |
| WO | WO 2010/139703 | | 12/2010 | |
| WO | WO 2011/115490 | | 9/2011 | |
| WO | WO-2012027285 A1 | * | 3/2012 | A61K 38/011 |
| WO | WO-2012080205 A1 | * | 6/2012 | A23L 33/115 |
| WO | WO 2012/173485 | | 12/2012 | |
| WO | WO 2013/036119 | | 3/2013 | |
| WO | WO 2014/058318 | | 4/2014 | |

OTHER PUBLICATIONS

Ruth A. Lawrence, Robert Michael Lawrence, Breastfeeding: A Guide for the Medical Profession, Elsevier Health Sciences, 2006, p. 131.*
Scopesi et al., "7-Ketocholesterol in human and adapted milk formulas", 2002, Elsevier Science Ltd., Clinical Nutrition 21(5): 379-384. (Year: 2002).*
Lacomba et al., "Sialic acid (N-acetyl and N-glycolylneuraminic acid) and ganglioside in whey protein concentrates and infant formulae", 2011, Elsevier Ltd., Internationl Dairy Journal 21: 887-895. (Year: 2011).*
Csapo et al., "Composition of the mother's milk I. Protein contents, amino acid composition, biological value. A review", 2009, Acta Univ. Sapientiae, Alimentaria, 2, 2, pp. 174-195. (Year: 2009).*
Jensen, Handbook of Milk Composition, Chapter 3 "Determinants of Milk Volume and Composition", 1995, Academic Press, Inc., pp. 87-117. (Year: 1995).*
Jensen, Handbook of Milk Composition, Chapters 5 "G. Nonprotein Nitrogen Compounds in Bovine Milk", 1995, Academic Press, Inc., pp. 468-469. (Year: 1995).*
Infant Formulas, Michigan Medicine, https://www.uofmhealth.org/health-library/hw148684, pp. 1-3. (Year: 2015).*
Lonnerdal et al., Compartalization and Quantitation of Protein in Human Milk, American Institute of Nutrition, Mar. 1986, pp. 1385-1395. (Year: 1986).*
English language translation of a Russian Office Action dated Jul. 19, 2016 (7 pages) including search report (2 pages) issued in corresponding Russian patent application No. 9-12846.
Ruth A. Lawrence, Robert Michael Lawrence, Breastfeeding: A Guide for the Medical Profession, Elsevier Health Sciences, 2011, 120-121.
International Search Report and Written Opinion in International Application No. PCT/EP2013/057405, dated Oct. 16, 2013, 11 pages.
International Preliminary Report on Patentability in International Application No. PCT/EP2013/057405, dated Oct. 14, 2014, 7 pages.
"Eat yourself smarter," Presentation given by Aarhus Universitet, Mar. 2017, 27 pages.
"ESPGHAN 2015—Big success for Hero," Presentation of Hero AG at ESPGHAN, The Netherlands, Jul. 6, 2015, 4 pages.
"Ingredients for the next generation," Arla Food products, Retrieved from the Internet: URL<https://www.arlafoodsingredients.com/globalassets/global/downloads/applications/infant/ingredients_for_the_next_0914_web.pdf>, 12 pages.
"Lacprodan MFGM-10: Whey Protein Concentrate," Arla Foods Ingredients Product Information Nutrition, 2010, 1 page.
"The Natural Goodness of Milk Fat," Presentation of Prof. Hernell; Hero AG, publically available on the Internet: URL<https://www.hero-nutrition-institute.com/en/milk-fat-one-most-important-nutrient-breast-milk-see-what-key-opinion-leaders-say>, 8 pages.
arlafoodsingredients.com' [online]. "Pediatric Ingredients: Phospholipids & MFGM," Webpage of Arla Ingredients concerning Lacprodan MFGM-10, available on or before May 13, 2017, [retreieved on Sep. 21, 2017]. Retrieved from the Internet: URL<https://www.arlafoodsingredients.com/our-ingredients/pediatric-ingredients/phodpholipids-mfgm/>, 4 pages.
Axelsson, Irene E. et al., "Formula with Reduced Protein Content: Effects on Growth and Protein Metabolism during Weaning," Pediatric Research, Feb. 1988, 24(3):297-301.
Ballard, Olivia et al.,"Human milk composition. Nutrients and Bioactive Factors," Pediatr Clin N Am, Feb. 2013, 60(1):49-74.
Blaas, N. et al., "Structural profiling and quantification of sphingomyelin in human breast milk by HPLC-MS/MS," Journal of Agricultural and Food Chemistry, Jun. 8, 2011, 59(11):6018-6024.
ClinicalTrials.gov' [online]. "ClinicalTrials.gov archive: View of NCT00624689 on Aug. 20, 2010," First Posted: Feb. 27, 2008, [retrieved on Sep. 21, 2017]. Retrieved from the Internet: URL<https://clinicaltrials.gov/archiveNCT00624689/2010_08_20>. 2 pages.
Colombo and Carlson, Is the Measure the Message: The BSID and Nutritional Interventions. Pediatrics, Jun. 2012,129(6), 1166-1167.
Commission Directive 2006/141/EC, "Infant formulae and follow-on formulae and amending Directive 1999/21/EC" Official Journal of the European Union, Dec. 30, 2006, 401(2):1-33.
Committee on Nutritional Status During Pregnancy and Lactation, "Nutrition During Lactation," Washington, D.C.: National Academies Press, 1991, ISBN: 0-309-53767-3.
Contarini et al., "Phospholipids in Milk Fat: Composition, Biological and Technicological Significance, and Analytical Strategies," Int. J. Mol. Sci., Jan. 2013, 14(2):2808-2831.
Demmers, Théa A., "Effects of Early Cholesterol Intake on Cholesterol Biosynthesis and Plasma Lipids Among Infants Until 18 Months of Age," Official journal of the American Academy of Pediatrics, Jun. 2005, 115(6): 1594-1601.
Donovan et al., "Non-Protein Nitrogen and True Protein in Infant Formulas," Acta Pædiatr Scand, Jul. 1989, 78: 497-504.
Elias-Argote, "Effects of Milk Processing on the Milk Fat Globule Membrane Constituents," Thesis for the degree of Master of Sci-

(56) References Cited

OTHER PUBLICATIONS ence in Agriculture, with Specialization in Dairy Products Technology, California Polytechnic State University, San Luis Obispo, Jul. 2011, 129 pages.
European Commission, Health and Consumer Protection Directorate-, "Report of the Scientific Committee on Food on the Revision of Essential Requirements of Infant Formulae and Follow-on Formulae," SCF/CS/NUT/IF/, May 18, 2003, 65, 214 pages.
General Curriculum for doctoral studies in Medical Science; Umeå University, For students admitted as of Jan. 1, 2012, aiming for a doctoral degree, 7 pages.
Azuma et al., "Properties of Glycomacropeptide and Para-K-casein Derived from Human K-Casein and Comparison of Human and Bovine K-Caseins as to Susceptibility to Chymosin and Pepsin", Agricultural and Ciological Chemistry, 2025-2031, 1984.
"Deckelbaum et al., ""Infant Formula: Evaluating the Safety of New Ingredients""", Insitute of Medicine of the National Academies, 221 pages, 2004".
Blogspot.com' [online] "The TUMME Study", English Translation, Retrieved from the Internet: URL mittlivmedthvra.blogspot.com, 1 pages, 2011.
Faktaboken, "Semper infant food and special nutrition", The Facts Booklet, Semper Nutrition, 8 pages, 2012.
ISO 8381, "Milk-based infant foods—Determination of fat content—Gravimetric method (Reference method)", International Standard, 8 pages, 2000.
ISO 8968-5, "Milk—Determination of nitrogen content—Part 5: Determination of protein-nitrogen content", International Standard, 14 pages, 2001.
ISO 9831, "Animal feeding stuffs, animal products, and faeces or urine—Determination of gross calorific value—Bomb calorimeter method", International Standard, 11 pages, 1998.
Lind et al., "Intestinal absorption of copper from drinking water containing fulvic acids and an infant formula mixture studied in a suckling rat model", BioMetals, 12: 191-187, 1999.
Notice of Opposition filed against European Patent No. 2836084, dated Mar. 21, 2019, 22 pages.
Sabel et al., "Fatty acid patterns early after premature birth, simultaneously analysed in mothers' food, breast milk and serum phospholipids of mothers and infants", Lipids in Health and Disease, 8: 20, 15 pages, 2009.
"CFR Code of Federal Regulations Title 21"—21CFR131.110 https://web.archive.org/web/20111004055050/https://www.accessdata.fda.gov/scripts/cdrh/cfdocs/cfcfr/cfrsearch.cfm?fr—131.110 [archived Apr. 10, 2011], 2 pages.
"D100—Calculations on examples of D86", Spreadsheets for Nutritional Contents of Examples 5-8 in D86, 6 pages, Mar. 21, 2019.
"Milk Facts", Fluid Milk Definitions, https://web.archive.org/web/20111228112107/http://www.milkfacts.info/Milk%20Processing/Fluid%20Milk%20Production.htm [archived Dec. 28, 2011], 3 pages, 2019.
"Mitt Liv som mamma, fru och matte", Tummen, mittlivmedthyra.blogspot_2011_08_tummen, 4 pages, Aug. 2011.
"Nutrition During Lactation", National Academy Press, 326 pages, 1991.
"The Tummy study", English translation of mittlivmedthvra.blogspot.com, 1 page, No Date.
Aarhus University—Presentation 2017, 17 pages.
Actual Analytic results of Fomula A, 7 pages, Mar. 21, 2019.
Arla Foods: Ingredients for the next generation, 12 pages, No Date.
Arla Foods: Ingredients: Phospholipids and MFGM, 4 pages, 2017.
Arla Foods: Lacprodan MFGM-10 datasheet (1), 2 pages No Date.
Arla Foods: Lacprodan MFGM-10 datasheet (2), 1 page No Date.
Assignment relating to U.S. Appl. No. 14/391,494, 5 pages, 2015.
Beggio et al., "Quantification of total cholesterol in human milk by gas chromatography", J Sep Sci: 1-7, 2018.
English translation of title p. 1, pp. 2, 9, 12 and 13; and parts of table at pp. 20 and 21 of D102, 8 pages, No Date.

European Commission Milk and milk products in the European Union. Luxembourg: Office for Official Publications of the European Communities, 29 pages, 2006.
Brown, "Nutrition through the life cycle," Fourth edition, Wadsworth Cengage Learning, 2008, 3 pages.
Jensen, Handbook of Milk Composition, Chapter 5 "Nitrogenous Components of Milk", 1995, Academic Press, Inc., pp. 351-494, (Year: 1995).
Jensen, Handbook of Milk Composition, Chapter 6 "Milk Lipids", 1995, Academic Press, Inc., pp. 495-575, (Year: 1995).
Atkinson et al., "Protein and non-protein nitrogen in human milk," CRC Press, Jun. 1989, 3 pages.
EP OPP,"Declaration of Sean Austin," in European Appln No. 3175719, dated Feb. 5, 2020, 3 pages.
Veras Garderob, "Tumme studien," Aug. 2008, retrieved on May 25, 2020, retrieved from http://verasgarderob.blogspot.com/2008/08/tumme-studien.html, 2 pages (with English translation).
He et al., "Fecal microbiome and metabolome of infants fed bovine MFGM supplemented formula or standard formula with breast-fed infants as reference: a randomized controlled trial", Scientific Reports, 9: 11589, 14 pages, 2019.
He et al., "Metabolic phenotype of breastfed infants, and infants fed standard formula or bovine MFGM supplemented formula: a randomized controlled trial", Scientific Reports, 9: 339, 13 pages, 2019.
Heine et al., "Sialic acid in breast milk and infant formula food", Monatsschr Kinderheilkd, 141(12):946-950, 1993.
Horwitz, "Official Methods of Analysis of the Association of Official Analytical Chemists", 13th Ed., 39 pages, 1980.
Notice of Opposition to EP 2836084, dated Mar. 21, 2019, 38 pages.
Nutrimenthe, "The Young Scientists Competition at the Nutrimenthe International Conference, Sep. 13, 2013", 2 pages, Retrieved from Internet on Sep. 21, 2017.
Rigo et al., "An Infant Formula Free of Glycomacropeptide Prevents Hyperthreoninemia in Formula-Fed Preterm Infants", JPGN 32: 127-130, 2001.
Self Nutrition Data, Know What You Eat, "Vegetable oil, Coconut", Extract from the USDA, Nutrition Facts Label, 4 pages, 2014.
Smith, "The Experimental Feeding of Dried Breast Milk", (1924) J. Biol. Chem. 61:625-631, 1924.
Timby et al., "Infections in Infants Fed Formula Supplemented With Bovine Milk Fat Globule Membranes", JPGN, 60: 384-389, 2015.
Timby et al., "Oral Microbiota in Infants Fed a Formula Supplemented with Bovine Milk Fat Globule Membranes—A Randomized Controlled Trial", PLoS One 12(1): e0169831, 18 pages, 2017.
Umea University, "General Curriculum for doctoral studies in Medical Science", 7 pages, 2004.
www.hero-nutrition-institute.com', "ESPGHAN 2015—Big success for Hero" Retrieved from Internet Sep. 21, 2017, Internest URL: "https://www.hero-nutrition-institute.com/en/espghan-2015-%E2%80%93-big-success-hero", 4 pages, 2015.
Gibson et al., "Fatty acid composition of human colostrum and mature breast milk," The American Journal of Clinical Nutrition, Feb. 1981, 34(2): 252-257.
Gurnida et al., "Association of complex lipids containing gangliosides with cognitive development of 6-month-old infants," Early Hum Dev doi: 10.1016 (Aug. 2012) [epub Jan. 12, 2012].
Haque et al., "Importance of dietary cholesterol for the maturation of mouse brain myelin," Siosci Biotech Siochem, Jan. 1992, 56(8):1351-1354.
Haschke et al., "Sustainable Clinical Research, Health Economic Aspects and Medical Marketing: Drivers of Product Innovation," Nestlé Nutrition Institute, Feb. 2010, 66:125-141.
Heine et al., "Sialic acid in breast milk and infant formula food," PubMed, Jan. 10, 2017, 2 pages.
Hernell et al., "Clinical Benefits of Milk Fat Globule Membranes for Infants and Children," J Pediatr, Jun. 2016, 173S:S60-S65.
hero-nutrition-institute.com' [online]. "Last evidences on milk fat in Prague: benefits on baby's development," Feb. 12, 2016, [retrieved on Sep. 21, 2017]. Retrieved from the Internet: URL<https://www.hero-nutrition-institute.com/en/%E2%80%9Clast-evidences-milk-fat-prague-benefits-baby%E2%80%99s-development%E2%80%9D>. 4 pages.

(56) References Cited

OTHER PUBLICATIONS

Jayaprakasha et al., "Production of Functional Whey Protein Concentrate by Monitoring the Process of Ultrafilteration," Asian-Aust. J. Anim. Sci. Apr. 20, 2005, 3:433-438.
Jensen, "Lipids in Human Milk," Lipids, Dec. 1999, 34(12):1243-1271.
Jensen, Robert G., "Handbook of Milk composition," San Diego, California: Academic Press, 1995, ISBN: 0-12-384430-4, 6 pages.
Kamelska et al., "Variation of the cholesterol content in breast milk during 10 days collection at early stages of lactation," Acta ABP Biochimica Polonica, vol. 59, No. 2, 2012 [epub Apr. 27, 2012].
Koletzko et al., "Global Standard for the Composition of Infant Formula: Recommendations of an ESPGHAN Coordinated International Expert Group," Journal of Pediatric Gastroenterology and Nutrition, Nov. 2005, 41(5): 584-599.
Koletzko et al., "Lower protein in infant formula is associated with lower weight up to age 2 y: a randomized clinical trial," Am J Clin Nutr, Jun. 2009, 89(6): 1836-1845.
Koletzko et al., "Physiological aspects of human milk lipids," Early Human Development, Nov. 2001, 65 Suppl: S3-S18.
Koletzko et al., "Protein intake in the first year of life: a risk factor for later obesity? the EU Childhood Obesity Project" Adv Exp Med Biol , Feb. 2005, 569: 69-79.
Lucas, A. et al., "How much energy does the breast fed infant consume and expend?" British Medical Journal, vol. 295, Jul. 11, 1987.
Markus et al., "Whey protein rich in a-lactalbumin increases the ratio of plasma tryptophan to the sum of the other large neutral amino acids and improves cognitive performance in stressvulnerable subjects," Am J Clin Nutr, Jun. 2002, 75: 1051-1056.
meadjohnson.com' [online]. "MFGM improves cognitive performance—Learn more," Webpage of Mead Johnson Nutrition concerning MFGM, available on or before Jul. 10, 2017, [retrieved on Sep. 21, 2017]. Retrieved from the Internet: URL<www.meadjohnson.com.hk/MFGM-improves-cognitive-performance/Learn-more>. [English translation] 4 pages.
Nutritiondata.self.com' [online]. "SELFNutritionData: know what you eat, Vegetable oil, coconut," extract from the USDA, available on or before Jul. 13, 2010 via Internet Archive: Wayback Machine URL<https://web.archive.org/web/20100713182428/http://nutritiondata.self.com/facts/fats-and-oils/508/2>, [retrieved on Sep. 21, 2017]. Retreived from: URL<http://nutritiondata.self.com/facts/fats-and-oils/508/2>, 4 pages.
Öhlund et al., "BMI at 4 years of age is associated with previous and current protein intake and with paternal BMI," European Journal of Clinical Nutrition, Feb. 2010, 64(2), 138-145.
Oshida, Kyoichi et al., "Effects of Dietary Sphingomyelin on Central Nervous System Myelination in Developing Rats" Pediatric Research, Apr. 2003, 53(4): 589-593.
Owen et al., "Does initial breastfeeding lead to lower blood cholesterol in adult life? A quantitative review of the evidence," Am J Clin Nutr, Aug. 2008, 88(2):305-314.
Owen et al., "Effect of infant feeding on the risk of obesity across the life course: a quantitative review of published evidence," Pediatrics, May 2005, 115(5):1367-1377.
Raiha et al., "Whey Predominant, Whey Modified Infant Formula with Protein/energy Ratio of 1.8g/100 kcal: Adequate and Safe for Term Infants From Birth to Four Months," J Pediatr Gastroenterol Nutr, Sep. 2002, 35(3): 275-281.
Regulation (EU) No. 1169/2011 of the European Parliament and of the Council of Oct. 25, 2011. Annex XIV, 46 pages.
Reilly et al., "Metabolisable energy consumption in the exclusively breast-fed infant aged 3-6 months from the developed world: a systematic review," British Journal of Nutrition, Jul. 2005, 94(1): 56-63.
Singhal et al., "Early nutrition and leptin concentrations in later life" The American Journal of Clinical Nutrition, Jun. 1, 2002, 75(6): 993-999.
Smith, "The experimental feeding of dried breast milk" J. Biol. Chem., Oct. 1, 1924, 61(3): 625-631.
Socha et al., "Milk protein intake, the metabolic-endocrine response, and growth in infancy: data from a randomized clinical trial," Am J Clin Nutr, Dec. 2011, 94(6 Suppl): 1776S-1784S.
Souci et al., "Food composition and nutrition tables," 7th edition, human milk, May 21, 2008, pp. 6-7.
Tanaka et al., "The pilot study: Sphingomyelin-fortified milk has a positive association with the neurobehavioural development of very low birth weight infants during infancy, randomized control trial" Brain & Development, Jan. 1, 2013, 35(1): 45-52.
Timby et al., "Cardiovascular risk markers until 12 mo of age in infants fed a formula supplemented with bovine milk fat globule membranes," Pediatr Res, Oct. 2014, 76(4): 394-400.
Timby et al., "Neurodevelopment, nutrition, and growth until 12 mo of age in infants fed a low-energy, low-protein formula supplemented with bovine milk fat globule membranes: a randomized controlled trial 1-3," Am J Clin Nutr, Feb. 5, 2014, 99(4): 860-8.
Timby et al., "Supplementation of Infant Formula with Bovine Milk Fat Globule Membranes," Adv Nutr, Mar. 10, 2017, 8(2): 351-355.
Timby, "Effects of feeding term infants low energy low protein formula supplemented with bovine milk fat globule membranes," Doctoral Thesis, Umeå University, Department of Clinical Sciences, Pediatrics, 2014, 69 pages.
Uauy et al., "Fat and Fatty Acid Requirements and Recommendations for Infants of 0-2 Years and Children of 2-18 Years," Ann Nutr Metab, Sep. 2009, 55(1-3): 76-96.
US assignment of U.S. Appl. No. 14/391,494, US national phase of the underlying PCT/EP20 13/057405, Reel/Frame 034852/0428, recorded Jan. 30, 2015, 5 pages.
Wang et al., "Brain ganglioside and glycoprotein sialic acid in breastfed compared with formula-fed infants," Am J Clin Nutr, Nov. 1, 2003, 78(5): 1024-1029.
Wang et al., "Concentration and distribution of sialic acid in human milk and infant formulas," Am J Clin Nutr, Oct. 1, 2001, 74(4): 510-515.
Wang et al., "Dietary sialic acid supplementation improves learning and memory in piglets," Am J Clin Nutr, Feb. 1, 2007, 85(2): 561-569.
Wang et al., "The role and potential of sialic acid in human nutrition," European Journal of Clinical Nutrition, Nov. 2003, 57(11): 1351-1369.
Ward et al., *Advanced dairy chemistry volume 2—lipids*, third edition, Chapter 6: Composition, Applications, Fractionation, Technological and Nutritional Significance of Milk Fat Globule Membrane Material, Fox and Sweeney (ed)., Springer, New York, 2006, 34 pages.
Wikidiff.com' [online]. "WikiDiff Cognitive vs Conative—What's the difference?" available on or before May 14, 2017 via Internet Archive: Wayback Machine URL<https://web.archive.org/web/20170514222358/http://wikidiff.com/cognitive/conative>, [retrieved on Sep. 21, 2017]. Retreived from: URL<http://wikidiff.com/cognitive/conative>. 2 pages.
Wurtman et al., "Synapse formation and Cognitive Brain Development: effect of docosahexaenoic acid and other dietary constituents," Metabolism, Oct. 1, 2008, 57: S6-S10.
Zavaleta et al., "Efficacy of an MFGM-enriched Complementary Food in Diarrhea, Anemia, and Micronutrient Status in Infants" Journal of pediatric gastroenterology and nutrition, Nov. 1, 2011, 53(5): 561-568.
Ziesel et al., "Choline phosphatidylcholine and SM in human and bovine milk and infant formulas," Journal of Nutrition, Feb. 1986, 116(1): 50-58.
Notice of Opposition filed on behalf of Nestec S.A. against European Patent 2836084, dated Sep. 19, 2017, 37 pages.
Notice of Opposition to a European Patent by ZBM Patents—Zea, Barlocci &Markvardsen against European Patent 2836084, dated Sep. 19, 2017, 41 pages.
Notice of Opposition filed on behalf of N.V. Nutricia, Zoetermeer against European Patent 2836084, dated Sep. 19, 2017, 19 pages.
Notice of Opposition to a European Patent by Aria Foods amba against European Patent 2836084, dated Sep. 19, 2017, 78 pages.
Notice of Opposition filed on behalf of Patentanwaltskanzlei Dr. Karin Jung against European Patent 2836084, dated Sep. 19, 2017, 34 pages.

(56) References Cited

OTHER PUBLICATIONS

De Wit's Lecturer's Handbook on Whey and Whey Products, 1st ed., European Whey Products Association, Feb. 2001, Table of Contents and p. 30.
Greer et al., "An infant formula with decreased weight gain and higher IQ: are we there yet?" The American Journal of Clinical Nutrition, 2014, 99(4):757-758.
"Lacprodan MFFM-10: Whey Protein Concentrate," Arla Foods Ingredient, Datasheet 1, dated Apr. 23, 2010, 2 pages.
"Lacprodan MFFM-10: Whey Protein Concentrate," Arla Foods Ingredient, Datasheet 2, dated Apr. 23, 2010, 1 pages.
blogspot.com [online] "The TUMME Study", 2011, retrieved on Jun. 24, 2019, retrieved from URL<mittlivmedthvra.bloqspot.com>, 1 page (English translation).
Faktaboken, "Semper infant food and special nutrition", The Facts Booklet, Semper Nutrition, 2012, (English Translation of the title p. 1, 2, 9, 12 and 13, 20 and 21 of D102), 8 pages.
hero-nutrition-instutite.com [online], "The Natural Goodness of Milk Fat," Presentation of Prof. Hernell, Hero AG, retrieved on Dec. 3, 2019, retrieved from URL<https://www.hero-nutrition-institute.com/en/milk-fat-one-most-important-nutrient-breast-milk-see-what-key-opinion-leaders-say>, 8 pages.
www.arlafoodsingredients.com [online], "Ingredients for the Next Generation: The Expert's View," Arla Food Products, retrieved on Feb. 18, 2018, retrieved from URL<<https://www.arlafoodsingredients.com/globalassets/global/downloads/applications/infant/ingredients_for_the_next_0914_web.pdf>, 12 pages.

\* cited by examiner

NUTRITIONAL COMPOSITION

RELATED APPLICATION DATA

This application is a continuation application of pending prior U.S. patent application Ser. No. 14/391,494, filed Oct. 9, 2014, which is the National Stage of International Application No. PCT/EP2013/057405 filed Apr. 9, 2013, and claims benefit of Swedish Application No. 1250357-9 filed Apr. 10, 2012, which are all herein incorporated by reference in their entirety.

FIELD OF INVENTION

The present invention concerns the field of nutritional compositions and infant formulas.

BACKGROUND

Research has shown that birth weight and growth patterns during the first years of life are relevant to the development of the metabolic syndrome with obesity, insulin resistance, type 2 diabetes and increased risk of cardiovascular disease in adulthood (D. J. P. Barker. *Hormone Research* 2005; 64 (suppl. 3):2-7). According to "the growth acceleration hypothesis" a fast growth during the first year of life, probably due to imprinting effects on the metabolic system in the body, results in an increased risk to develop metabolic syndrome, type-2 diabetes and coronary heart diseases later in life. (A. Singhal et al. *The Lancet,* 2004, vol. 363: 1642-1645).

Formula-fed infants put on weight faster during the first year of life compared to breastfed infants (J. Baird et al. *Paediatric and Perinatal Epidemiology,* 2008, Vol. 22, 575-586. K. G. Dewey. *Biol Neonate,* 1998; 74:94-105).

Infants who are formula-fed have in adulthood increased risk of impaired glucose tolerance and unfavourable lipid profile with low HDL-cholesterol and high LDL-cholesterol, all known risk factors for cardiovascular disease (A. C. J. Ravelli et al. *Arch Dis Child* 2000; 82:248-252). If the infant formula is made more like human milk this may possibly give a reduction of these differences and, it could provide a substantial reduction of morbidity in the population.

Infant formula is commonly based on cow's milk proteins, which differ from breast milk proteins in their amino acid composition. To cover infant's needs of amino acids the protein level in the infant formula therefore has to be higher. This gives a much higher total intake of protein by formula-fed infants, which can give a metabolic stress on the infants.

Koletzko B et al. suggest that limiting the protein content of infant and follow-on formula and, more generally, the dietary protein intake during infancy might constitute a potentially important approach to reducing the risk of childhood overweight and obesity. A large randomized controlled trial showed significant effects of a lower protein intake from infant formula on weight, weight-for-length, and BMI during the first 2 years of life. (B. Koletzko et al. *Am J Clin Nutr,* 2009; 89:1836-1845).

Increased protein intake as is the result of using the high protein formulas out on the market today leads to higher insulin levels in the infants. Formula-fed infants get about 70% more protein than breastfed infants between 3-6 months of age (M. J. Heinig et al. *Am J Clin Nutr,* 1993; 58:152-156). More figures regarding increased protein intake are also shown in a more recent European study. (Koletzko B. et al, *Adv Exp Med Biol.* 2005; 569:69-79).

Infant formula fed children also have a higher energy intake than breastfed children. The reason why formula-fed children have a higher risk of getting too much energy relative to their need to meet their growth is multifactorial. Mothers who give food in the bottle have a greater tendency to "maternal control", i.e. the child is less able to control its own intake, compared with breastfed children (T. E. M. Taveras et al. *Pediatrics,* 2004, vol. 114 (5) e577-e584).

In a study of cholesterol intake by Demmers T. A. et al. the formula-fed infants had at 4 months of age 40% higher energy intake than the breastfed infants. (T. A. Demmers et al. *Pediatrics,* 2005, vol. 115 (6) 1594-1601). Increased "maternal control" has been shown to accelerate overweight among heavy children and also to increase the problem with underweight among children with difficulties to put on weight (C. Farrow et al. *Pediatrics,* 2006, vol. 118 (2) e293-e298).

Infants fed with different formulas with different energy density appeared able to compensate to some extent for greater or lesser energy density by adjusting the quantity of food consumed, but a higher energy density of the formula tends to increase the calorie intake of the infant (S. J. Fomon et al. *J. Nutrition,* 1969, 98: 241-254 and S. J. Fomon et al. *Acta Paediatr Scand* 64: 172-181, 1975). There is a big interest in these issues but only a few studies available.

There are differences seen in morbidity between breastfed and formula-fed infants. Breastfed infants have less respiratory infections, ear infections and gastroenteritis than formula-fed infants. (A. L. Wright et al. *BMJ,* vol. 299, 946-949, B. Duncan et al. *Pediatrics,* 2003, vol. 91 (5) 867-873, G. Aniansson et al. *Pediatr Infect Dis J,* 1994, vol. 13 (3) 182-188 and K. G. Dewey et al. *J Pediatr,* 1992, vol. 126 (No. 5) part 1 695-702). One possible explanation is that breast milk contains more immune modulating substances than cow's milk.

Sialic acid is found in milk both bound to proteins, e.g. kappa-casein with its content of glyco macro peptide (cGMP), and lipid bound in gangliosides. Sialic acid is found in high concentrations in human brain and breast milk, and has been proposed as a milk factor that could have an impact on the development of the central nervous system (B. Wang et al. *Eur J Clin Nutr,* (2003) 57, 1351-1369). Enrichment of sialic acid in the diet of piglets has been shown to improve memory and learning (B. Wang et al. *Am J Clin Nutr,* 2007; 85:561-569).

Furthermore, long-chain polyunsaturated fatty acids (LCPUFA) have a clear impact on the developing nervous system. Breastfed children have higher levels of arachidonic acid (ARA) and docosahexaenoic acid (DHA) in both blood and brain than children who received formula without the addition of ARA and DHA (M. Makrides et al. *Am J, Clin Nutr* 1994; 60:189-94).

Dietary sphingomyelin is probably also important for the development of an infant's nervous system. In studies with rat it is shown that enrichment with sphingomyelin in the diet increases the myelisation of the nervous system (K. S. T. Oshida et al. *Pediatr Res,* 2003. 53: p. 589-593). Breast milk contains sphingomyelin and the amount is between 4-9 mg/100 g.

Using new technology within the milk industry, purification enables new fractions of milk to be separated. An example of such a fraction is "milk fat globule membrane" (MFGM), which comprises 120 different proteins in a phospholipidic double layer which surrounds fat droplets within the milk. Sphingomyelin, phosphatidyl choline, phosphatidyl serine and phosphatidyl ethanolamine are the dominating phospholipids. Butyrophilin, MUC1 and PAS6/7 (lactadherin), CD14, TLR1 and TLR4 are examples of the dominant proteins which all have antimicrobiological effect (V. L. Spitsberg. *J Dairy Sci*, 2005. 88: p. 2289-2294, T. A. Reinhardt & J. D. Lippolis. *J Dairy Res*, 2006. 73(4): p. 406-416).

The cholesterol level in breast milk is much higher than in a regular vegetable oil based infant formula. The level in breast milk is around 10 mg/100 ml and the level in infant formulas on the market is around 0.2-1.0 mg/100 ml. Therefore breastfed infants today get a much higher intake of cholesterol than formula-fed infants. This gives a higher blood cholesterol level in breastfed infants during infancy. However at older age, >17 years, breastfed infants show a lower blood cholesterol level, which is associated with lower risk for development of cardiovascular disease compared to children who were formula-fed (C. G. Owen et al. *Am J Clin Nutr*, 2008; 88:305-314, T. A. Demmers et al. *Pediatrics*, 2005, vol. 115 (6) 1594-1601). The blood cholesterol level in infants is not only dependent on the oral intake of cholesterol, but also of the endogenous synthetic rate of cholesterol. Studies on infants have shown that formula-fed infants, who have a low blood cholesterol level, have an up regulated endogenous synthetic rate of cholesterol, in comparison with breastfed infants. Maybe this is an effort to try to compensate for the low oral intake. In spite of this endogenous up regulation of cholesterol synthesis, formula-fed infants have a lower level of blood cholesterol than breastfed infants. Efforts have therefore been made to add cholesterol to infant formula to mimic the level in breast milk and increase the blood level of cholesterol in formula-fed infants (T. M. Bayley et al. *Metabolism* 2002; 51:25-33). To shed further light on this Demmers et al. performed a clinical study on infants, where cholesterol was added to infant formula as solved in ethanol to increase the availability. Blood cholesterol and FSR (fractional synthesis rate) were analysed up to 18 months of age. They demonstrated decreased cholesterogenesis and increasing circulating plasma cholesterol concentration at 4 months of age as the dietary cholesterol increased. But these differences were not seen at 18 months of age. The ratio of total cholesterol/ HDL-cholesterol differed between breastfed and cholesterol supplemented cow's milk formula group at 4 months which indicates a different cholesterol metabolism between breastfed and cholesterol supplemented group. Since the study group was only followed up to 18 months the long term consequences of this is not known. Although the results confirmed the results from other studies that an increased cholesterol intake during the first months gives a higher total blood cholesterol level, both the importance of how the cholesterol is added and the long term consequences on cholesterol level at adulthood have to be further studied. (T. A. Demmers et al. *Pediatrics*, 2005, vol. 115 (6) 1594-1601).

SPECIFIC BACKGROUND

There is a need for a nutritional composition or an infant formula which gives the formula-fed infant for example a growth pattern, metabolic burden and level of blood cholesterol similar to breastfed children and also at the same time for example reduces risk of morbidity during infancy as well as later in life.

There is also a need for a production method for such a nutritional composition which has all the desired ingredients in order to achieve a nutritional composition which gives the nutritional composition formula-fed infants a similar growth and development pattern as breastfed children. There is also at the same time need of a production method to produce a nutritional composition which allows for a good taste for such a nutritional composition, for example similar to the taste of breast milk.

There is a need to develop an infant formula with reduced protein content and low energy content, which still covers the infant's need of amino acids and other nutrients.

PRIOR ART

None of the prior art discloses a nutritional composition according to the invention;

Several attempts of making an infant formula more like human milk have been performed:

Methods for producing low protein and high calorie content formulas are shown in EP1841330B1. However the method described in EP1841330B1 does not include a method for producing a formula with increased level of sialic acid and cholesterol and it is not a formula with reduced energy. In US 2008003330 a method to make a formula with increased level of sialic acid and phospholipids is disclosed, but with a standard high level of proteins as well as a standard level of energy and cholesterol. The infant formula described in US2008003330 uses MFGM additions.

WO2007073192 shows an infant formula depleted from casein-glyco-macropeptide (cGMP).

Infant formulas with increased concentrations of α-lactalbumin have also been presented in order to mimic breast milk composition but with a standard high level of proteins and energy (for example; E. L. Lien. Am J Clin Nutr, 2003; 77 (suppl):15555-1558S). The objective of the described study was to study the effects of glyco macro peptide- or α-lactalbumin-supplemented infant formulas on growth, mineral status, iron-, zinc- and calcium absorption, as well as plasma amino acids, blood urea nitrogen and plasma insulin concentrations. Breastfed infants and infants fed with α-lactalbumin enriched formula had similar plasma essential amino acid and insulin profiles, which were different from those of infants fed with glyco macro peptide or control formula.

WO 2010/027258 A1 shows an infant formula comprising a lipid component which has a larger lipid globule size and wherein the protein source for example is based on acid whey or sweet whey from which casein-glyco-macropeptide (cGMP) has been removed. The infant formula in WO 2010/027258 A1 preferably has a protein content of 1.25-1.35 g/100 ml.

In previous developed infant formulas, the cGMP content in the infant formulas was lowered to reduce the amount of threonine (see for example WO2006069918, page 4).

OBJECT OF THE INVENTION

The general object of the invention is to find a new nutritional composition, for example an infant formula or a follow on formula which results in the same or similar growth and development and morbidity as for breastfed children within the first months in an infant's life but also the same growth and development later in life when the infants or children become grown-ups. There is a need for a nutritional composition which results in growth and development of formula-fed infants in a similar manner as breastfed children and which still doesn't unnecessary burden the infants' metabolic and renal systems and which also is similar in taste as breast milk. There is also a need for a production method for producing such a nutritional composition.

SUMMARY OF THE INVENTION

Infant formulas are for example intended to be used as the only dietary source for infants that are not breastfed or as a supplement to partially breastfed infants or as a part of the diet after weaning. To be able to fulfil this, the product has to cover many different dietary requirements of the infant. It was therefore a great challenge to formulate an adequate nutritional composition according to the invention.

The challenges known to the skilled person, but not at present satisfactory taken care of are: protein content and protein quality, energy density, content of essential fatty acids, content of medium chain fatty acids (MCT), content of sialic acid, ganglio sides, sphingomyelin, and the content and quality of cholesterol in the formulas out on the market today. According to the present invention it has surprisingly been possible to improve all these parameters without at the same time negatively affect the overall composition of the product.

Protein quantity and protein quality: There shall be an adequate amount of protein, but not too high level (as referred to above) and the protein quality must be such that it is well digested by the infant and will cover the amino acid requirement of the infant in as low quantity of protein as possible. Since the amino acid requirement absolutely must be covered one has earlier been forced to add an excess of protein due to the composition of the protein sources used. There was therefore a need to invent a product that within a lower protein level can cover the amino acid requirement. At the same time it is important to keep the non-protein nitrogen (NPN) at a low level. All this is achieved with the nutritional composition and the production method according to the present invention.

Energy density: It is well known that infants fed a standard formula show a more rapid weight gain than breastfed infants. This is due to several factors: A higher protein intake, a higher caloric intake due to a higher energy density of the formula and a less developed self-regulation of caloric and volume intake. Since a part of the total carbohydrates in breast milk (the oligosaccharides) are not used as an energy source and the lactose content in infant formula earlier was regarded as the same as the total carbohydrate content in breast milk. The content of lactose in the nutritional composition according to the invention is reduced in order to reach a nutritional composition with decreased energy density (kcal/100 ml). No one has before developed a product where both protein content and caloric content are reduced which still has all other nutrients present in desired levels. According to the present invention such a formula has been developed. The nutritional composition according to the invention has been tested in a clinical study. The growth of the infants using the nutritional composition according to the invention was similar to the growth of breastfed infants. The study thereby shows that the content of energy and amino acids was satisfactory.

Phospholipids, sphingomyelin, sialic acid, gangliosides are all nutrients which are recognized as important nutrients for the infant. The challenge has been to be able to incorporate suitable sources of these nutrients into the composition of the formula without negative effect on other important nutrients and the general composition of the product. In the present invention this incorporation has been performed in levels close to the level in breast milk without any negative effect on the total composition.

Cholesterol is also recognized as an important component in infant formula. However, so far, a method to include available cholesterol in the product in such a manner that it is well absorbed and metabolized has not been developed. Addition of free cholesterol has been tested in previous studies, but there are questions about its availability, metabolism and protection against oxidation during processing. In the present invention this has been solved by addition of cholesterol rich raw materials, without negative effect on other important parameters.

Other important ingredients as essential fatty acids, long chain poly unsaturated fatty acids, medium chain triglycerides, minerals, vitamins have all been added as carefully selected raw materials.

The result of the invention is a formula where the above mentioned challenges have all been possible to fulfill simultaneously, without compromising with ingredients in the general composition of the product. A clinical study with a formula according to the invention has been performed. The result verifies the goal of the invention. The overall aim with the nutritional composition for example an infant formula according to the invention is to reach an outcome similar to breastfed infants with regard to development of infants fed with the composition according to the invention rather than to reach an infant formula which has ingredients present in similar levels as in breast milk.

The production method according to the invention; i.e. the careful selection of ingredients present in the described amounts according to the invention is not an obvious selection to a person skilled in the art. Surprisingly the selection of ingredients at the present levels according to the invention makes the formula both fulfil the nutritional requirements of the authorities and at the same time, due to the special composition selection, makes infants fed with the nutritional composition according to the invention behave and develop more like breastfed infants. Finding a nutritional composition which makes the infant, fed with the formula behave and develop similar to infants fed with breast milk is a known problem which until now has remained unsolved. A nutritional composition is invented which has a low protein content as well as low energy content and this is combined with a high content of milk derived phospholipids and sialic acid and cholesterol and further in combination with no addition of free amino acids. The formula according to the invention has a low protein content, expressed in g/100 ml, which still gives a low energy percentage (E %) derived from proteins compared to standard formula in spite of the reduced energy content of the formula.

This nutritionally complete formula will contribute to that the development of the child regarding growth, body composition, metabolic parameters, morbidity and neurological development becomes more similar to that of breastfed children.

Parameters which are influenced when using the formula according to the invention are for example growth, body composition (% fat), blood cholesterol, blood urea nitrogen (BUN), sialic acid in saliva, fasting insulin, blood pressure, morbidity short term, immunological parameters, neurological parameters and micro flora. Long term parameters are for example decreased obesity and morbidity in childhood as well as adulthood. The infants fed with the nutritional composition according to the invention surprisingly develop in a manner closer to breast-fed infants' development.

A nutritional composition according to the invention fulfils the objectives of making the infant fed with the composition to grow and develop in the same manner as breastfed infants.

Use of the nutritional composition during the first 6 months of life of an infant as the only nutrition, or from birth to up to 12 months of age as a complementary diet may for example minimize the difference in growth and/or body composition (weight (wt) % fat) and/or cholesterol levels and/or blood urea nitrogen values and/or plasma amino acids and/or sialic acid in saliva and/or fasting insulin levels and/or morbidity and/or inflammation parameters and/or occurrence of obesity in childhood between breastfed and formula-fed children in combination with that the nutritional composition according to the invention gives no unnecessary burden to the metabolic system of the formula-fed infants.

Previously infant formulas were made using whey protein concentrate from which the cGMP was removed. This is for example described in EP 2046149. Surprisingly, due to the special selection of ingredients present in the composition according to the invention, cGMP does not have to be removed and this facilitates for presence of high sialic acid levels in the nutritional composition according to the invention. In the formula according to the invention the threonine content is not too high. The amino acid levels in the invention formula are in line with the limits set up by the government Commission Directive 2006/141/EC and still the formula also is within limits for protein and energy content as set up according to the directive. No one has previously produced a formula with both low protein and low energy content, which in combination with this has high sialic acid content and high content of milk derived cholesterol. There is nothing in the literature that would instruct the person skilled in the art how to produce such a formula. Since there are that many different parameters which have to be considered it is not obvious how to compose an infant formula which fulfils the need of the infants as well as the commission directive, national legislations and recommendations within the paediatric nutritional field.

The purpose of the invention is not to be as close as possible in composition as breast milk, but to be as close as possible in outcome for the infants fed with the formula according to the invention. Uptake and availability of nutrients are different from the formula compared to breast milk.

The infants have a growth and development more similar to breastfed infants when they are fed with the formula according to the invention.

Below different embodiments according to the invention are shown, the embodiments are exemplifying embodiments and not limiting the scope of the invention:

In one embodiment of the invention the nutritional composition according to the invention comprises;
  a total energy content of 67 kcal/100 ml or lower, for example 62 kcal/100 ml or lower, especially lower than 60 kcal/100 ml or between 58-62 kcal/100 ml or for example 58-60 kcal/100 ml
  a protein content of 1.25 g/100 ml or lower, or for example lower than 1.25 g/100 ml or for example between 1.1-1.25 g/100 ml or between 1.1 g/100 ml to lower than 1.25 g/100 ml.

In one embodiment of the invention the nutritional composition according to the invention has a total energy content of 62 kcal/100 ml or lower and the composition comprises;
  a protein content which is 1.25 g/100 ml or lower,
  a cholesterol content of 5-10 mg/100 ml.

In one embodiment of the invention the nutritional composition according to the invention has a total energy content of 62 kcal/100 ml or lower and the composition comprises;
  a protein content which is 1.25 g/100 ml or lower,
  an energy content from protein of 7.8-8.4 percent of the total energy content of the nutritional composition,
  an energy content from fat which is at least 49 percent or more of the total energy content of the nutritional composition,
  a medium chain fatty acid comprising 8 to 10 carbons content which is less than 3 weight % of total amount of fatty acids,
  a sialic acid content of 10-25 mg/100 ml or higher,
  a cholesterol content of 5-10 mg/100 ml
  a sphingomyelin content of 9-15 mg/100 ml or higher In another embodiment of the invention the nutritional composition according to the invention comprises;
  a total energy content of 62 kcal/100 ml or lower, or for example lower than 60 kcal/100 ml or between 58-62 kcal/100 ml or for example 58-60 kcal/100 ml
  a protein content of 1.25 g/100 ml or lower, or for example lower than 1.25 g/100 ml or for example between 1.1-1.25 g/100 ml or between 1.1 g/100 ml to lower than 1.25 g/100 ml.
  an energy content from protein of 7.8-8.4 percent of the total energy content of the nutritional composition or for example 8.0-8.3 percent of the total energy content of the nutritional composition
  a fat content which is at least 49 percent or more of the total energy content of the nutritional composition or especially 50 percent or more for example 52-53 E % fat, for example 52.5% of the energy of the formula is derived from fat
  a medium chain fatty acid comprising 8 to 10 carbons content which is 0.5-3 wt % of total amount of fatty acids or for example 1-3% or for example 1-2% of total amount fatty acids in the composition.
  sialic acid content of 18 mg/100 ml or higher, or between 18-25 mg/100 ml
  a sphingomyelin content of 9-15 mg/100 ml or more than 10 mg/100 ml or especially 13 mg/100 ml
  a cholesterol content of between 5-10 mg/100 ml or between 7-10 mg/100 ml or for example 0.2-0.3 weight % of cholesterol expressed as percentage of total fat content of the formula or for example 8 mg/100 ml which is 0.23 wt % cholesterol expressed as percentage of total fat content of the formula.

In another embodiment of the invention the nutritional composition according to the invention further comprises
  lipid bound sialic acid as gangliosides of between 1.5-5 wt % of total sialic acid content, or for example 4 wt % lipid bound sialic acid of total sialic acid content.

In one embodiment of the invention the energy content in the nutritional composition according to the invention is for example 58-60 kcal/100 ml, wherein 51.8-53.4 E % fat. The protein content is for example 1.1-1.25 g/100 ml and 7.8-8.2 E % protein, and a low NPN content, is for example a NPN content between 0.015-0.020 g/100 ml and a high sialic acid content is for example 18-20 mg/100 ml. The level of milk derived cholesterol is for example 7-9 mg/100 ml.

In another embodiment of the invention the energy content in the nutritional composition according to the invention is 60 kcal/100 ml and the composition comprises 52.5 E % fat. The protein content is 1.2 g/100 ml and the composition comprises 8 E % protein. In another embodiment of the invention the energy content in the nutritional composition according to the invention is 60 kcal/100 ml and 52.5 E % fat, the protein content is for example 1.2 g/100 ml and the composition comprises 8 E % protein, with non-protein-nitrogen (NPN) content of 0.015-0.020 g/100 ml or for example 0.016 g/100 ml and 13 mg/100 ml of sphingomyelin and a high sialic acid content is for example 19 g/100 ml. The level of milk derived cholesterol is for example 8 mg/100 ml and the composition comprises a medium chain fatty acid (comprising 8 to 10 carbons) content which is less than 3 wt % of total amount of fatty acids A nutritional composition according to the invention, or the use according to the invention, may also refer to the composition of the invention as a powder suitable for making a liquid composition after reconstitution with water.

The nutritional composition according to the invention may be prepared from powder by mixing 114 g of a nutritional composition powder with 900 ml water to make 1000 ml of liquid composition according to the invention.

The nutritional composition according to the invention further comprises the following features in any combination;

In other embodiments according to the invention the formula comprises 5-6 wt % whey protein concentrate solids rich in phospholipids and 12-15 wt % cream solids expressed as percentage of the total weight of the solids in the composition.

In one embodiment according to the invention the formula further comprises a sphingomyelin content in the formula is for example between 9-15 mg/100 ml, or 10 mg/100 ml or higher for example 13 mg/100 ml.

Further embodiments are also alternative embodiments according to the invention;

A nutritional composition according to the present invention wherein the composition comprises intact or partly hydrolysed milk protein.

A nutritional composition according to the present invention wherein the amino acid content in the composition is originated from sources selected from for example; sweet whey solids, casein solids, milk solids and cream solids.

A nutritional composition according to the present invention wherein the sphingomyelin content in the composition according to the invention is between 9-15 mg/100 ml, or 10 mg/100 ml or higher, especially 13 mg/100 ml.

A nutritional composition according to the present invention wherein the composition is comprised from the following raw materials;
- sweet whey solids 32-40 kg/1000 kg dry powder composition or between 32.6-39.9 kg/1000 kg dry powder composition
- sodium caseinate between 4.6-5.7 kg/1000 kg dry powder composition or between 4.66-5.69 kg/1000 kg dry powder composition
- skim milk solids between 66-81 kg/1000 kg dry powder composition or between 66.3-81 kg/1000 kg dry powder composition
- whey protein concentrate solids rich in phospholipids between 47-58 kg/1000 kg dry powder composition or between 47.1-57.6 kg/1000 kg dry powder composition
- cream solids between 117-143 kg/1000 kg dry powder composition.

A nutritional composition according to the present invention wherein the composition comprises; sweet whey solids of 36.3 kg/1000 kg dry powder composition, sodium caseinate of 5.18 kg/1000 kg dry powder composition, skim milk solids of 73.7 kg/1000 kg dry powder composition, whey protein concentrate solids of 52.4 kg/1000 kg dry powder composition, cream solids of 130 kg/1000 kg dry powder composition.

A nutritional composition according to the present invention wherein the values described above defining the ingredients in the composition in kg/1000 kg powder is the same when defining the ingredients in the composition by kg/8770 L of ready to drink nutritional composition.

Further the composition may comprise vitamins (see for example vitamins mentioned in Formula A below), minerals (see for example minerals mentioned in Formula A below), fats (see for example fats mentioned in Formula A below or in the detailed description), lactose and/or other essential nutrients (for example choline, taurine, inositol, carnitine, fructo oligo saccharides (FOS), galacto oligo saccharides (GOS), probiotics or nucleotides).

Further, the nutritional composition according to the invention may comprise smaller amounts of other ingredients, for example less than 7 wt % of the total formula weight. Examples of such other ingredients are other milk solids (not in specified formula) e.g. acid whey protein concentrate, butter milk solids, whole milk solids etc. Said other ingredients may be present as long as the specification of the nutritional composition, described above of the invention is fulfilled.

A nutritional composition according to the present invention wherein the composition comprises; sweet whey solids of 36.3 kg/1000 kg dry powder composition, sodium caseinate of 5.18 kg/1000 kg dry powder composition, skim milk solids of 73.7 kg/1000 kg dry powder composition, whey protein concentrate solids rich in phospholipids of 52.4 kg/1000 kg dry powder composition, cream solids of 130 kg/1000 kg dry powder composition. Further the composition may comprise vitamins (see for example vitamins mentioned in Formula A below), minerals (see for example minerals mentioned in Formula A below), fats (see for example fats mentioned in Formula A below), lactose and/or other essential nutrients (for example choline, taurine, inositol, carnitine).

Further, the nutritional composition according to the invention may comprise other ingredients as long as the specification of the nutritional composition, described above of the invention is fulfilled.

Use of a composition according to the present invention as a nutritional composition or as an infant formula or as a follow-on formula.

Use of a nutritional composition according to the present invention as an nutritional composition for achieving a development and/or growth pattern and/or morbidity more similar to breast-fed infants and/or regarding parameters which is any of growth, body composition wt % fat, cholesterol level, blood urea nitrogen (BUN), sialic acid in saliva, fasting insulin levels or decreased obesity and or morbidity in childhood.

Further the production method of the invention is described according to the following embodiments;

A method for producing a nutritional composition according to the present invention in order to get a high sialic acid content and a high cholesterol content in combination with low protein and energy content, comprising the steps;
- providing ingredients per 1000 kg dry powder or per 8770 L ready to drink nutritional composition;
- sweet whey solids between 32-40 kg/1000 kg dry powder composition or per 8770 L ready to drink nutritional composition
- sodium caseinate between 4.6-5.7 kg/1000 kg dry powder composition or per 8770 L ready to drink nutritional composition
- skim milk solids between 66-81 kg/1000 kg dry powder composition or per 8770 L ready to drink nutritional composition
- whey protein concentrate solids rich in phospholipids between 47-58 kg/1000 kg dry powder composition or per 8770 L ready to drink nutritional composition
- cream solids between 117-143 kg/1000 kg dry powder composition or per 8770 L ready to drink nutritional composition Further additionally comprising for example vitamins, minerals, fats, lactose and other essential nutrients (for example choline, taurine, inositol, carnitine); and, mixing the ingredients.

A method for producing a nutritional composition according to the invention wherein no free amino acids are added other than naturally occurring free amino acids present in milk raw materials.

It is further possible to add small amounts of other ingredients into the composition according to the invention as long as the specification of the nutritional composition, described above of the invention is fulfilled. For example, acid whey solids can be used.

A method according to the present invention for producing a nutritional composition according to the invention wherein no free amino acids are added other than the additions made by adding raw materials from sources selected from; sweet whey solids, casein solids, milk solids and cream solids.

DETAILED DESCRIPTION

Introduction

Figure 1:
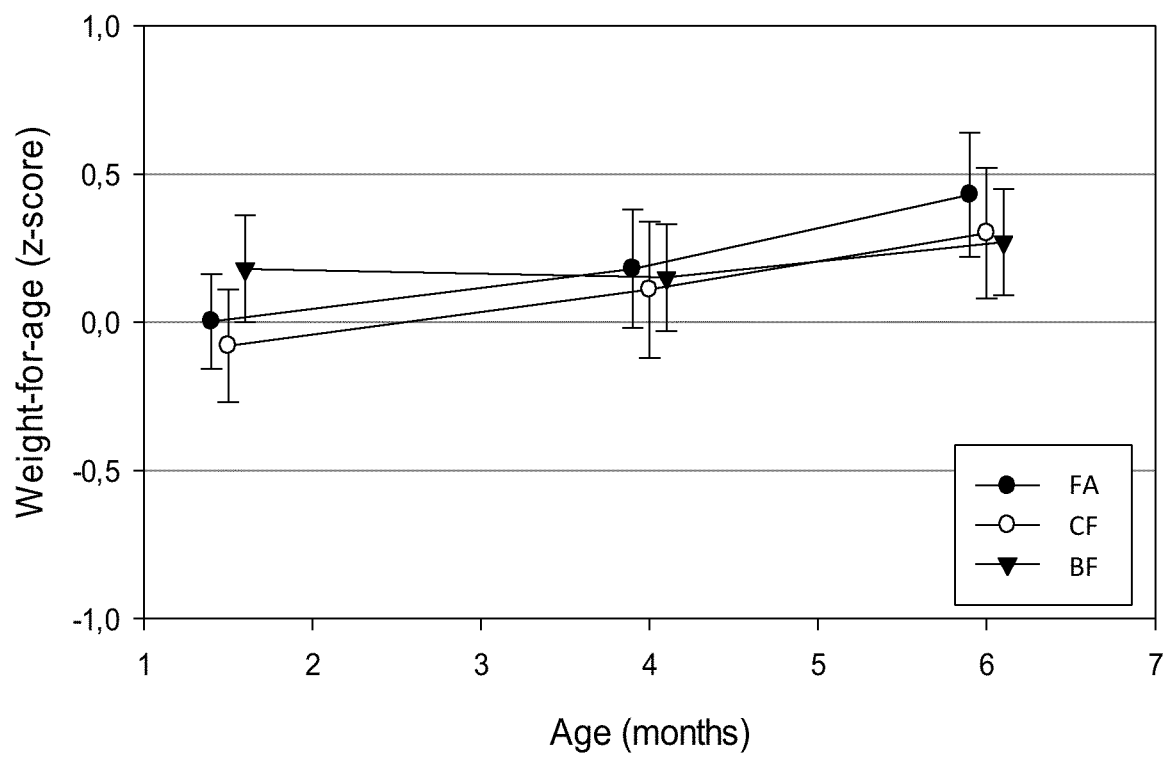
FIG. 1 is a graph illustrating the mean weight-for-age (z-scores) by age for the groups of Formula A (FA), control formula (CF), and breast-fed (BF) groups.

The general object of the invention is to find a nutritional composition, for example an infant formula which generates growth and development, in short and long term, in formula-fed children similar to breastfed children.

The growth and development for the infants fed with the nutritional composition according to the invention is similar to the growth and development in short and long time as for breastfed children and this without unnecessary burden on the metabolic system of the infants due to overload of nitrogen sources, for example protein in too high amounts.

A nutritional composition according to the invention is for example an infant formula which is defined as foodstuff intended for particular nutritional use by infants from birth and during the first 6 months of life and satisfying by itself the nutritional requirements of this category of persons. Further, for example the nutritional composition according to the invention may be intended to be used as a follow-on formula which is defined as a complement or as a part of a progressively diversified diet wherein the formula feeding starts for example when the infant is at the age of 4 months and then the feeding of formula is a part of the infant diet up to the infant is 12 months of age. The infant may start to include the formula according to the invention between the age of 4-6 months which is the time when most infants start with solids, or at least when the breastfed infants nutrient intake is complemented with solids from 6 months of life up to 12 month of life. A nutritional composition according to the invention may for example be an infant formula or a follow-on formula. The nutritional composition according to the invention may also be abbreviated to as "a formula" or "a composition". An infant formula is a formula intended to be used as the only source of nutrients from birth and up to 6 months of age and a follow-on formula may be defined as a formula intended to be used from 6 months onwards during the weaning period, as a-complement to the solids which are introduced in the infant's diet at the same age.

A nutritional composition also referred to as a formula according to the invention is for example a powder intended to be mixed with water before use or a liquid ready-to-use product.

The term "ready-to-use product" as used herein, unless otherwise specified, refers to liquid formulas suitable for direct oral administration to an infant, wherein the formulas are ready to-feed liquids, reconstituted powders, or diluted concentrates.

Definition of an infant is a child under the age of 12 months.

The solution to the problem stated above is a nutritional composition according to the invention which minimizes the difference in growth and insulin levels between breastfed children and formula-fed children.

A nutritional composition according to the invention has low energy content in combination with low protein content. A nutritional composition according to the invention is more nutritional complete and comprises several milk derived raw materials including sweet whey, whey protein concentrate rich in phospholipids, cream rich in cholesterol and also comprises gluco macro peptide (cGMP) which allows for a higher sialic acid content. Another important factor of the present invention is that it further may have low non-protein nitrogen content (NPN).

There are several reasons for why formula-fed children have a higher risk of getting too much energy relative to the need for their growth. Increased protein intake leads to higher insulin levels and formula-fed infants get about 70% more protein than breast-fed infants between 3-6 months of age (M. J. Heinig et al. *Am J Clin Nutr,* 1993; 58:152-156). (B. Koletzko et al. *Am J Clin Nutr,* 2009; 89: 1836-1845). Mothers who give food in the bottle have a greater tendency to "maternal control", i.e. the child has less control of their own intake, compared to breastfed children (E. M. Taveras et al. *Pediatrics,* 2004, vol. 114 (5) e577-e584. and R. S. Gross et al. *Academic Pediatrics,* 2010; 10:29-35 and L. Ruowei et al. *Pediatrics,* 2008; 122:S77-S85).

The effect of increased "maternal control" has been twofold: to provide an accelerated rate of obesity for heavy children, but also increasing problems with underweight children (C. Farrow & J. Blissett. *Pediatrics,* 2006, vol. 118 (2) e293-e29). There are also some studies which have shown that young infants are able to down, and up regulate food intake, respectively depending on the energy density of the infant formula (S. J. Fomon et al. *J. Nutrition,* 1969, 98: 241-254 and S. J. Fomon et al. *Acta Paediatr Scand* 64: 172-181, 1975).

The formula according to the invention comprises a low level of protein and also a low level of total energy content.

Energy Density

The invented formula has an energy level of for example 67-58 kcal/100 ml, or lower or for example lower than 60 kcal/100 ml or between 58-62 kcal/100 ml or for example 58-60 kcal/100 ml. These selected energy levels are at the lowest level of the Commission Directive 2006/141/EC. In the report of the Scientific Committee on Food on the revision of Essential Requirements of Infant formula and Follow-on Formula it is said that "It should be emphasized that an energy intake below the recommended intake does not mean that individually this intake is deficient and can be harmful for the subject." The invented formula has a lower energy density than conventional formulas and is nutritional complete and fulfills the nutritional needs of a fast growing infant during the first year of life.

Since a part of the total carbohydrates in breast milk (the oligosaccharides) is not used as an energy source and the lactose content in infant formula earlier was regarded as the same as the total carbohydrate content in breast milk, the content of lactose in the invention formula is reduced in order to reach a nutritional composition with decreased energy density (kcal/100 ml).

Protein Content

Further, the formula according to the invention comprises a low level of protein, in g/100 ml, and still a low percentage of energy (E %) derived from proteins compared to a standard formula. The nutritional composition according to the invention comprises 7.2-8.4 E % protein, especially 7.8-8.4 E % protein or for example 8.0-8.3 E % protein.

The protein content of the ready to drink nutritional composition is for example lower than 1.25 g/100 ml or for example lower than 1.25 g/100 ml or for example between 1.1-1.25 g/100 ml or between 1.1 g/100 ml to lower than 1.25 g/100 ml.

Fat Content

The invented formula further has a high E % (derived) from fat. The fat content of the nutritional composition according to the invention is at least 49% or more of the total energy content of the nutritional composition, for example, a fat content which is 49-54% or for example, 50-54%, especially 52-53%, or for example 51.8-53.4% of the total energy content of the nutritional composition.

Fat is necessary in the diet of infants and young children because of their extraordinary energy needs and limited dietary intake capacity. In addition, different fat sources provide poly unsaturated essential fatty acids as linoleic- and linolenic acids as well as long chain poly unsaturated essential fatty acids as arachidonic acid and docosahexaenoic acid.

Deficiencies in the amounts of these long-chain poly unsaturated fatty acids in the diet during infancy may affect the maturation of the central nervous system, including visual development and intelligence (see for example E. E. Birch et al. *Early Hum Dev*, 2007, Vol. 83, 279-284 and M. S. Kramer et al. *Arch Gen Psychiatry*, 2008; 65(5):578-584).

The nutritional composition according to the invention further comprises for example 0.43-0.47% or for example 0.45% arachidonic acid (ARA) (n-6 20:4) and for example 0.26-0.30% or for example 0.28% docosahexaenoic acid (DHA)(n-3 22:6) of total fatty acids, respectively. To get these fatty acids in these percents and ratios raw material from algal oil and fungal oil are used. Further the invention formula may comprise rape seed oil, palm olein oil, sun flower oil and sun flower high oleic oil to get a fatty acid pattern similar to breast milk. The sun flower oils contribute mainly with the essential fatty acid linoleic acid (n-6 18:2). And the rape seed oil contributes mainly with the essential fatty acid linolenic acid (n-3 18:3). Other oils which also may be used are: rape seed oil (high oleic), soybean-, maize-, safflower-, evening primrose-, borage-, palm-, palm olein-, palm kernel-, coconut-, babassu-, fish oil, egg lipids, structured fat with high percent palmitic acid esterified to β-position in the triglycerides and lard. In order to even better mimic the fat composition in breast milk cream is used.

The use of dairy cream as an ingredient in the present nutritional composition (or the use of dairy cream solids when making a nutritional composition powder to be mixed with water) contributes to the high levels of milk derived cholesterol in the nutritional composition according to the invention. This dairy cream usage contributes to the high levels of cholesterol (5-10 mg/100 ml) in the composition according to the invention. Due to the special composition according to the invention the addition of cholesterol as an ingredient (due to addition of dairy cream and whey protein concentrate rich in phospholipids) gives a similar blood cholesterol level as in breastfed infants during the feeding period but also later in life for those infants fed with the nutritional composition according to the invention.

The cream also improves the taste of the invention formula. The formula also contains whey protein concentrate rich in phospholipids which also contribute to the content of milk derived cholesterol in the invention formula as well as of the milk derived phospholipid sphingomyelin. Sphingomyelin is included in an amount of 10 mg/100 ml or higher. The invention formula comprises for example on dry basis between 26-32 weight percent fat or for example on dry basis 30.7 weight percent fat whereof between 15-19 weight percent of the total amount fat is vegetable fat, or for example 18.5 weight percent of total fat content is vegetable fat.

The content of medium chain fatty acids (MCT) comprising 8 to 10 carbons in the nutritional composition according to the invention is for example 0.5-3 weight percent of total amount of fatty acids or for example 1-2 weight percent of total amount fatty acids in the composition. The invention formula mimics the content of MCT in breast milk. Mature breast milk has 1-2 weight percent MCT of total fatty acids (R. A. Gibson et al. *Am. J. Clin. Nutr.* 34: 252-257, 1981).

The use of sweet whey, cream and whey protein concentrate rich in phospholipids, during manufacturing of the nutritional composition or infant formula according to the present invention, makes the nutritional composition comprise a high amount of sialic acid and milk derived phospholipids. The nutritional composition may for example comprise a sialic acid content of 10 mg/100 ml or higher or 18 mg or higher or for example a sialic acid content of between 10-25 mg/100 ml or between 18-25 mg/100 ml. For example sweet whey solids, cream solids and whey protein concentrate solids rich in phospholipids may also be used to produce a powder formula according to the invention which is intended to be mixed with water before usage.

The use of these solids or ingredients also makes the nutritional composition according to the invention to comprise lipid bound sialic acid as ganglio sides of between 1.5-5% of total sialic acid content or for example 4% of total sialic acid content. Said lipid bound sialic acid, as gangliosides, content in the formula according to the invention is between o.03-0.08 weight percent of total fat content of the formula or for example o.05 weight percent of total fat content of the formula.

Ganglio sides stimulate intestinal maturation and support a healthy micro flora and also the neuronal development and brain development. Sialic acid plays a role in cognitive development and can protect against enteric infection.

Further the formula according to the invention comprises cholesterol which is a sterol that is mainly synthesized in the liver but also in other tissues. It is used to produce hormones in cell membranes and is transported in the blood plasma of all mammals. Breast milk comprises cholesterol. By using dairy cream and whey protein concentrate rich in phospholipids as raw material the invented formula's content is high in cholesterol, similar to the level in breast milk.

The nutritional composition according to the invention has a cholesterol content of between 5-10 mg/100 ml, or between 7-10 mg/100 ml or for example 8 mg/100 ml which for example is between 0.2-0.3 weight percent of the total fat content of the nutritional composition or for example 0.23 weight percent of the total fat content of the nutritional composition according to the invention.

Further sweet whey, cream and whey protein concentrate rich in phospholipids, all comprise cGMP. By, for example not removing cGMP from the nutritional composition according to the invention the sialic acid content is kept high. High sialic acid content is for example about 10-25 mg/100 ml or between 18-20 mg/100 ml of the nutritional composition according to the invention. By not removing cGMP from the raw materials used to produce the formula, the nutritional composition according to the invention is likely to for example increase the level of sialic acid in saliva (more similar to breastfed). The higher intake of sialic acid can have an effect on for example morbidity and cognitive behaviour in the invention formula-fed infants.

Sphingomyelin is the major component of the phospholipid fraction in breast milk, and is found in lower concentrations in conventional nutritional compositions compared to the formula according to the invention. Sphingomyelin is metabolized to ceramide which concentration correlates with degree of myelination of the nervous system. Experiments on rats with experimentally inhibited myelination have shown that supplements of sphingomyelin increases myelination (K. Oshida et al. *Pediatr Res,* 2003, vol. 53 (4) 589-593). The milk derived sphingomyelin content in the formula according to the invention is 9 mg/100 ml or higher, or between 9-15 mg/100 ml, or 13 mg/100 ml.

The nutritional composition according to the invention comprises a special composition of raw materials. The nutritional composition according to the present invention still has a low burden-effect on the metabolic system of the formula-fed infant although it comprises cGMP.

The levels of arachidonic acid (ARA) and docosahexaenoic acid (DHA) in the nutritional composition according to the invention are of similar levels as present in breast milk.

The present invention provides a nutritional composition and a method for producing such a composition.

Non-Protein-Nitrogen

Non-protein nitrogen (NPN) is a term used to refer collectively to components which are not proteins which are present in food and which comprise nitrogen. (NPN in milk is mainly urea-nitrogen (about 50%), creatine, creatinine, NH3 etc.)

Since it is important not to have a surplus of nitrogen in formulas for infants we have endeavoured to have a low level of NPN<20 mg/100 ml in the nutritional composition according to the invention, for example a low non-protein nitrogen (NPN) value between 0.015-0.020 g/100 ml. Surprisingly the invention formula has a low NPN value although it has a total new composition of raw materials.

Amino Acid Profile

It is known that an infant formula needs a predetermined amino acid profile to fulfill the children's need. This is also regulated by the government Commission Directive 2006/141/EC. The amino acid supply in an infant's first months of life must be sufficient in quantity as well as quality to fulfill the needs of this period of life. Guidelines, recommendations with minimum values have been established with regard to amino acid composition of infant formulas. An amino acid profile of the nutritional composition according to the invention is presented in the table below. The clinical study confirms that the amino acid composition in the invention formula is adequate for the requirement for growth.

| Amino acid | Minimum value Commission Directive (mg/100 kcal) | Interval according to the invention (mg/100 kcal) |
| --- | --- | --- |
| Leucine | 166 | 197-229 or 217 |
| Lysine | 113 | 165-192 or 180 |
| Methionine | 23 | 36-42 or 40 |
| Cystine | 38 | 40-46 or 44 |
| Phenylalanine | 83 | 83-96 or 87 |
| Tyrosine | 76 | 64-74 or 72 |
| Threonine | 77 | 114-132 or 124 |
| Tryptophan | 32 | 35-41 or 39 |
| Valine | 88 | 116-135 or 127 |
| Isoleucine | 90 | 116-135 or 127 |
| Histidine | 40 | 46-53 or 50 |
| Cystine + Methionine* | 61 | 76-88 or 84 |
| Phenylalanine + Tyrosine* | 159 | 147-170 or 159 |

The concentration of methionine and cysteine can be calculated together since the amino acid cysteine can be formed from methionine. And the concentration of tyrosine and phenylalanine can be calculated together since the amino acid tyrosine can be formed from phenylalanine. Therefore also combined levels of these amino acids are specified in the table above*.

Amino Acid Sources of the Present Nutritional Composition:

The formula according to the invention has a composition which is such that the wanted amino acid profile is achieved without addition of any free amino acid. The formula according to the invention is manufactured without addition of any free amino acid (or isolated amino acids) to get a desired amino acid profile.

The wording free amino acids or isolated amino acids in this application mean descriptions for an amino acid substance which is isolated as a free acid or as a salt.

The formula according to the present invention is therefore not enriched with isolated amino acids, for example free amino acids. This is an advantage since free amino acids are usually bitter in taste. It is also expensive to add amino acids in their pure form. By using the ingredients according to the present invention the nutritional composition according to the invention does not need further addition of free or isolated amino acids and is therefore more similar to breast milk in taste.

Production Method

The formula according to the invention is according to one embodiment produced by mixing the below ingredients in kg per 1000 kg nutritional composition dry powder or kg per 8770 L finished nutritional composition.

| Raw material | Interval in the formula according to the invention (kg/1000 kg dry powder or kg/8770 L) | Amount in the formula according to the invention (kg/1000 kg dry powder or kg/8770 L) |
| --- | --- | --- |
| Sweet whey solids | 32-40 | 36 ± 2 |
| Sodium caseinate | 4.6-5.7 | 5.2 ± 0.3 |
| Skimmed milk solids | 66-81 | 74 ± 4 |
| Whey protein concentrate solids (rich in phospholipids) | 47-58 | 52 ± 3 |
| Cream solids | 117-143 | 130 ± 6 |

The nutritional composition may further comprise vitamins, minerals, fats, lactose and/or other essential nutrients (for example choline, taurine, inositol, carnitine, nucleotides).

Further, the nutritional composition according to the invention may comprise other ingredients as long as the specification of the nutritional composition, described above of the invention is fulfilled.

Whey Protein Concentrates Solids (Rich in Phospholipids)

Whey protein concentrate solids rich in phospholipids used as a component in the nutritional composition according to the invention is a whey protein concentrate with a high concentration of bioactive proteins and lipids. The whey protein concentrate has a high nutritional value, and is applicable in infant and clinical nutrition. Whey protein concentrate solids rich in phospholipids contain most of the insoluble membrane protein fragments from MFGM originally present in the whey, in addition to residual whey components, proteins, lactose and salts. The invention utilizes, whey protein concentrate solids rich in phospholipids obtained after removal of the major whey proteins by known industrial processing, such as filtration, ion-exchange chromatography, and the like. This fraction contains most of the insoluble membrane fragments, which contain protein and associated fat. The whey protein concentrate solids rich in phospholipids contains bioactive compounds, such as lactoferrin, α-lactalbumin, butyrophilin, MUC1, PAS6/7 (lactadherin), gangliosides, CD14, TLR1 and TLR4, IgG, cGMP, sialic acid and phospholipids (for example sphingomyelin, phosphatidyl choline, phosphatidyl serine and phosphatidyl ethanolamine). Phospholipids are important constituents of cellular membranes contributing significantly to the membrane structure and function.

Lacprodan MFGM-10 (from Arla foods) or similar raw materials from other suppliers may be used as enriched phospholipid whey protein concentrate solids in a formula according to the invention. For example the source of enriched phospholipid whey protein concentrate solids comprises at least 20 wt % phospholipids based on total lipid content, for example 20 to 70 wt % or for example 25 to 55 wt % phospholipids based on total lipid of the enriched phospholipid whey protein concentrate solid source.

The whey protein concentrate solids rich in phospholipids used in the nutritional composition according to the present invention is not depleted of cGMP.

The components of the whey protein concentrate solids rich in phospholipids may affect the development of the nervous system, morbidity and psychomotor development in a positive manner for infants fed with the nutritional composition according to the invention compared to infants fed standard infant formula or the control formula according to the invention.

Whey protein concentrate solids rich in phospholipids from bovine milk contain unique polar lipids and membrane specific proteins, for example lactoferrin, butyrophilin, MUC1 and PAS6/7 (lactadherin), CD14, TLR1 and TLR4 and phospholipids (including for example sphingomyelin and gangliosides). These components are recognized as nutritional and bioactive milk constituents and are present only scarcely in bovine milk compared to human milk.

Whey protein concentrate solids comprise gangliosides, sialic acid, sphingomyelin, phosphatidyl serine, phosphatidyl choline, phosphatidyl ethanolamine, lactoferrin, α-lactalbumin, etc.

Sweet Whey

Sweet whey is rich in α-lactalbumin. The high α-lactalbumin content makes it ideally suited as a protein source in infant formulas in order to fulfil desired amino acid pattern. Sweet whey also contains cGMP which is a source of sialic acid.

Cream

Cream is a natural and valuable source of short and medium chain fatty acids as well as milk derived cholesterol. The milk derived phospholipids in cream are besides important nutritional substances also valuable emulsifiers. The formula according to the invention may be manufactured using cream or cream solids. The fat content of the cream used according to the invention is for example of 36-40 wt % fat or 37 wt % fat.

Caseinate

Sodium caseinate or partly other salts of caseinates may be used in the invention formula.

Hydrolysed Protein

The protein source in the invention formula may be a hydrolysed protein.

Below is an exemplified description of the production process of the formula according to the invention, the following example of the invention is not limiting the scope of the invention:

The present invention provides a ready to drink nutritional composition or a powder formula intended to be reconstituted with water to a ready to drink nutritional composition and a method for producing such compositions.

In one embodiment the composition is a powder suitable for making a liquid composition after reconstitution with water. Or for example the composition is a ready to use liquid product.

Below is an example of ingredients for making the nutritional composition according to the invention.

Example of amounts of ingredients (kg/1000 kg) of a dry powder formula according to the invention which is intended to be reconstituted with water before usage (amounts of ingredients for the a ready to drink formula is below described in kg/8770 L);

| Description | Amount (interval) (kg/1000 kg or kg/ 8770 L)) |
|---|---|
| Lactose | 476-527 |
| Cream solids | 123-136 |
| Skim milk solids | 70.0-77.3 |
| Rape seed oil | 51.6-57.0 |
| Palm olein oil | 51.6-57.0 |
| Whey protein concentrate solids rich in phospholipids | 49.7-55.0 |
| Sun flower oil | 38.3-42.3 |
| Sweet whey solids | 34.5-38.1 |
| Sun flower oil HO | 24.9-27.6 |
| Minerals | 16.1-17.8 |
| Sodium caseinate | 4.92-5.44 |
| Dry lecithin | 4.26-4.70 |
| Arachidonic acid oil | 1.60-3.50 |
| Docosahexaenoic acid oil | 1.60-2.17 |
| Vitamin mix | 1.29-1.43 |
| Choline, taurine, myo-inositol, L-carnitine | 1.21-1.34 |

Examples of production methods according to the invention, not limiting the scope of the invention;

Production method of a powder nutritional composition according to the invention:

Milk based raw materials are mixed to a slurry. Standardized milk or milk powder and liquid whey or whey powder are mixed, if necessary, with additional water. Suitable equipment mixes the slurry in a tank with negative pressure to reduce foaming and incorporation of air.

Emulsifier and fat soluble vitamins are added to a blend of vegetable oils. The fat phase is then incorporated in the milk phase either in the mixing tank or dosed in line before homogenization. In line dosing of oil means that a part of the milk phase is heated, oil is dosed into the stream, homogenized and cooled down again.

Water soluble vitamins, additives such as taurine and minerals with a pro oxidative effect such as ferrous- and copper salts are added just before concentrating the slurry by means of a finisher to a final dry matter content of 50-55%. The concentrate is then heat treated to ensure the microbiological quality, spray dried, the powder cooled and stored. After quality control, product is packed or, if it is a semi product, first blended, combining the spray dried semi product with additional minerals, vitamins, bioactive ingredients and citric acid.

Production method of a Ready-to-drink nutritional composition according to the invention:

Water, made alkaline with calcium hydroxide, is mixed with whey or whey powder. The solution is neutralized before adding the carbohydrate source and standardized milk. Additional ingredients such as choline, taurine, inositol and carnitine are added before pasteurisation and fat phase injection and homogenization. The fat phase is made up of vegetable oils, emulsifiers and fat soluble vitamins. Before sterilization, vitamins are added and quality check is performed. The product is UHT-treated, a quick heat treatment at about 140° C. for 5 seconds, cooled and aseptically packed.

(UHT means Ultra High Temperature. Products from an UHT-process have good keeping qualities with retained nutritional values).

Below is an example of the nutritional composition according to the invention and also a description of a control formula, both used in a comparative study. The below example of the invention is not limiting to the scope of the invention;

The infant formula (Formula A) used in the study is an example of a nutritional composition according to the invention. The Control Formula is used for comparison. The comparative Control Formula is a representative infant formula of good quality available on the market.

The formulas included in the study have the following compositions (see table below)—Formula A is an example of the nutritional composition according to the invention;

| Description | Formula A (kg/1000 kg) | Control Formula (kg/1000 kg) |
| --- | --- | --- |
| Lactose | 502 | 536 |
| Cream solids | 130 | 89.6 |
| Skim milk solids | 73.7 | 105 |
| Rape seed oil | 54.3 | 43.4 |
| Palm olein oil | 54.3 | 75.9 |
| Whey protein concentrate solids (rich in phospholipids) | 52.4 | |
| Sun flower oil | 40.3 | 30.7 |
| Sweet whey solids | 36.3 | 61.1 |
| Sun flower oil HO | 26.3 | 30.7 |
| Minerals | 17.0 | 10.1 |
| Sodium caseinate | 5.18 | 6.56 |
| Dry lecithin | 4.48 | 4.03 |
| Arachidonic acid oil | 3.33 | 2.91 |
| Docosahexaenoic acid oil | 2.07 | 1.80 |
| Vitamin mix | 1.38 | 1.48 |
| Choline, taurine, myo-inositol, L-carnitine | 1.27 | 1.04 |
| L-arginine | | 0.689 |
| Potassium citrate | 4.68 | 2.58 |
| Calcium carbonate | 3.33 | 3.33 |
| Potassium chloride | 3.08 | 2.19 |
| Calcium hydrogenphosphate | 1.94 | |
| Magnesium sulphate | 1.78 | 0.583 |
| Sodium chloride | 1.40 | 0.972 |
| Ascorbic acid | 1.08 | 1.22 |
| Choline chloride | 0.648 | 0.486 |
| Sodium citrate | 0.500 | |
| Taurine | 0.415 | 0.370 |
| Ferrous sulphate | 0.178 | 0.150 |
| myo-Inositol | 0.135 | 0.120 |
| Zinc sulphate | 0.0863 | 0.0769 |
| Ascorbyl palmitate | 0.0782 | 0.0751 |
| L-carnitine | 0.0756 | 0.0656 |
| Vitamin D3 | 0.0539 | 0.0480 |
| Vitamin A | 0.0476 | 0.0424 |
| DL-a-tocopherol | 0.0350 | 0.0362 |
| Calcium D-pantothenate | 0.0296 | 0.0263 |
| Niacin | 0.0180 | 0.0160 |
| Copper sulphate | 0.00846 | 0.00754 |
| Thiamine hydrochloride | 0.00676 | 0.00602 |
| Vitamin K1 | 0.00561 | 0.00500 |
| Pyridoxine hydrochloride | 0.00546 | 0.00486 |
| Potassium iodide | 0.00073 | 0.00073 |
| Folic acid | 0.00062 | 0.00055 |
| Sodium selenite | 0.00039 | 0.00039 |
| Biotin | 0.00011 | 0.00010 |

Formula A, which is a nutritional composition according to the invention, with the ingredients described above, comprises the nutritional values presented below as ready for consumption (114 g of powder formula A is mixed with 900 ml water which gives 1000 ml ready to drink product);

a total energy content of 60 kcal/100 ml, a protein content of 1.2 g/100 ml, an energy content from protein of 8.0 (E %) of the total energy content of the nutritional composition a protein:energy ratio of 2.0/100 kcal a fat content which is 52.5 (E %) of the total energy content of the nutritional composition according to Formula A a medium chain fatty acid (comprising 8 to 10 carbons) content of 1.6 wt % of total amount of fatty acids in Formula A sialic acid content of 19 mg/100 ml a cholesterol content of 8 mg/100 ml lipid bound sialic acid as gangliosides of 4 wt % of total sialic acid content sphingomyelin content of 13 mg/100 ml Formula A has a high content of sialic acid from natural sources compared to standard formulas. The sialic acid content comes from two different sources, one, from whey protein concentrate solids (rich in phospholipids), which is lipid bound and the other from GMP, which is bound to carbohydrates. Formula A has a high milk derived content of sphingomyelin from natural sources compared to the Control Formula, namely whey protein concentrate solids (rich in phospholipids). It is an advantage to use said natural sources of sialic acid and sphingomyelin.

Energy % (E %) is a normal way to express the amount of kcal, which comes from fat, protein and carbohydrates in a nutritional formulation. The National food agency in Sweden (Livsmedelsverket) has identified this on http://www.slv.se/sv/grupp1/Mat-och naring/Svenska-narings-rekommendationer/Kalorier-kilojoule-och energiprocent---hur raknar-man/

The control formula, with the ingredients described in the table above, comprises the nutritional values presented below as ready for consumption (130 g of powder control formula is mixed with 900 ml water gives 1000 ml ready to drink product);

a total energy content of 66 kcal/100 ml
a protein content of 1.27 g/100 ml,
an energy content from protein of 7.7 (E %) of the total energy content of the nutritional composition according to the control formula
a fat content of 44.7 (E %) of the total energy content of the nutritional composition according to the control formula
a medium chain fatty acid (comprising 8 to 10 carbons) content of 1.5 wt % of total amount of fatty acids in the control formula
sialic acid content of 16 mg/100 ml
a cholesterol content of 4 mg/100 ml
lipid bound sialic acid as gangliosides of 2 wt % of total sialic acid content according to the control formula
sphingomyelin 1.8 mg Study
Study Design The study is a randomized double-blind intervention trial with exclusively breastfed infants as a reference group which means that three groups of children participate in the study:

1) Children who are breastfed.
2) Children who receive modified infant formula, "Formula A", according to the invention (see description above).
3) Children who receive a representative infant formula of good quality, herein called "Control Formula" (see description above)

Group Size

The study was set up to detect a possible difference of 0.5 standard deviation (SD) for each outcome variable, which corresponds to a weight difference of about 0.4 kg at 6 months or a difference of 3.25 percent of body fat measured by plethysmography at 2 months of age. The visual acuity equivalent to 0.5 SD is 0.25 octaves at 4 months of age, which is the difference seen when compared to children with feeding with or without DHA supplement. With a statistical "power" of 80% a group size of just over 60 children is required. 80 children were recruited per group, which gave a sufficient number of children per group completing the study.

Infants Included in the Study

From March 2008 to February 2012, 160 formula-fed infants (80 girls and 80 boys) and a breast-fed reference (BFR) group with 80 infants (40 girls and 40 boys), all born at Umeå University Hospital, Umea, Sweden, were recruited after inviting parents by telephone. Inclusion criteria were <2 months of age, gestational age at birth 37-42 weeks, birth weight 2500-4500 g, absence of chronic illness, and exclusive formula-feeding or, for the BFR group, exclusive breastfeeding at inclusion and mother's intention to exclusively breastfeed until 6 months. Formula-fed infants were stratified for sex and randomized to receive a low energy, low protein experimental formula (Formula A) or a standard formula (Control Formula) from inclusion until 6 months of age. Twins were co-randomized to the same intervention group. The intervention was blinded both to parents and staff until all infants had finished the intervention. Powdered formula was distributed to families together with preparation instructions in identical boxes marked with a code number.

Exclusion Criterion

Children with chronic diseases that may affect the outcome variables, such as neurological, endocrine or mal absorption illness are excluded from the study. Even children who for various reasons are not able to complete the study will be monitored and included in the statistical analysis according to the "intention to treat".

Outcome Parameters

The children will be followed from the time of enrollment up to 1 year of age with blood, saliva and stool samples and other tests, see below. The study is divided in two parts. The first study part is from inclusion up to 12 months of age, and the second part of the study is at 5 years of age.

Assessment of Growth

Visits were made at baseline (<2 months), 4 months and 6 months. At each visit, weight (Seca 757, Seca, Hamburg, Germany), length (Seca 416, Seca, Hamburg, Germany) and head circumference (Seca 212, Seca, Hamburg, Germany) were measured. Weight was recorded with an accuracy of 5 grams, length and head circumference with an accuracy of 0.1 cm. At inclusion and 4 months, body composition was measured using air-displacement plethysmography (Pea-Pod©, Life Measurement Inc, Concord, Calif., USA). Age-adjusted z-scores for weight, length, head circumference and body mass index (BMI) were calculated using the WHO growth standards.

Blood Samples and Analyses

At each visit, venous blood samples were drawn >2 h after the latest meal. From each group (FA, CF and BF), samples from 20 randomly selected infants (10 girls and 10 boys) were analyzed for plasma amino acid pattern. After acidifying plasma samples with sulfosalicylic acid, centrifuging and diluting the supernatant with Li-diluent spiked with AE-Cys, amino acids were separated by ion-exchange chromatography followed by analysis with a ninhydrin reaction detection system (Hitachi L-8900 Amino Acid Analyzer).

Apo A1, apo B, cholesterol, HDL and triglycerides were analysed with Vitros Chemistry ApoA1 reagent, ApoB reagent, CHOL slides, dHDL slides and TRIG slides on Vitros 5.1 FS (Ortho Clinical Diagnostics Inc). LDL was estimated by Friedewald's formula (Friedewald, W. T. et al Estimation of the concentration of low-density lipoprotein cholesterol in plasma, without use of the preparative ultracentrifuge. Clin Chem, 1972, 18, (6): p 499-502).

Metabolomics

Metabolomics was studied in the metabolites resulting from cellular metabolism. Metabolomics was used in order to detect specific metabolic differences between breastfed and formula-fed infants as well as between formula fed infants.

Development

The neurologic development can be measured with greater accuracy, the older the child is. At 12 months a psychologist performed a test with Bayley Scales of Infant and Toddler Development-III.

By the age of 5 years again a cognitive testing will be done, this time with the Wechsler Preschool and Primary Scale of Intelligence (WPPSI-R).

Dietary Record

Each month, starting from baseline, parents or caregivers record the type and amount of each food item consumed by the infant during 3 consecutive days up to 6 months of age.

Statistics

All analyses are presented on an intention-to-treat basis. Statistical calculations were made using IBM SPSS Statistics Version 19 (©IBM 1989, 2010). Comparisons of proportions were made by chi-square test or, when the expected count in any cell was less than 5, by Fisher's exact test. Comparisons of means were made by independent samples t-test. Variables that were not normally distributed were log-transformed before calculations and transformed back for presentation as geometric means and 95% confidence intervals. Adjusted p-values for differences between the Formula A and Control Formula groups were calculated in a multivariate model, including those background variables that significantly differed between the groups. Differences in levels of amino acids were calculated with ANOVA, and compensated for multiple comparisons by Bonferroni post-hoc test.

Results

The growth between the breast fed infants and the Formula A fed infants did not differ. The new nutritional composition according to the invention reduces the differences between breastfed and formula-fed infants in terms of metabolic factors, as well as neurological development.

Growth

Figure 2:
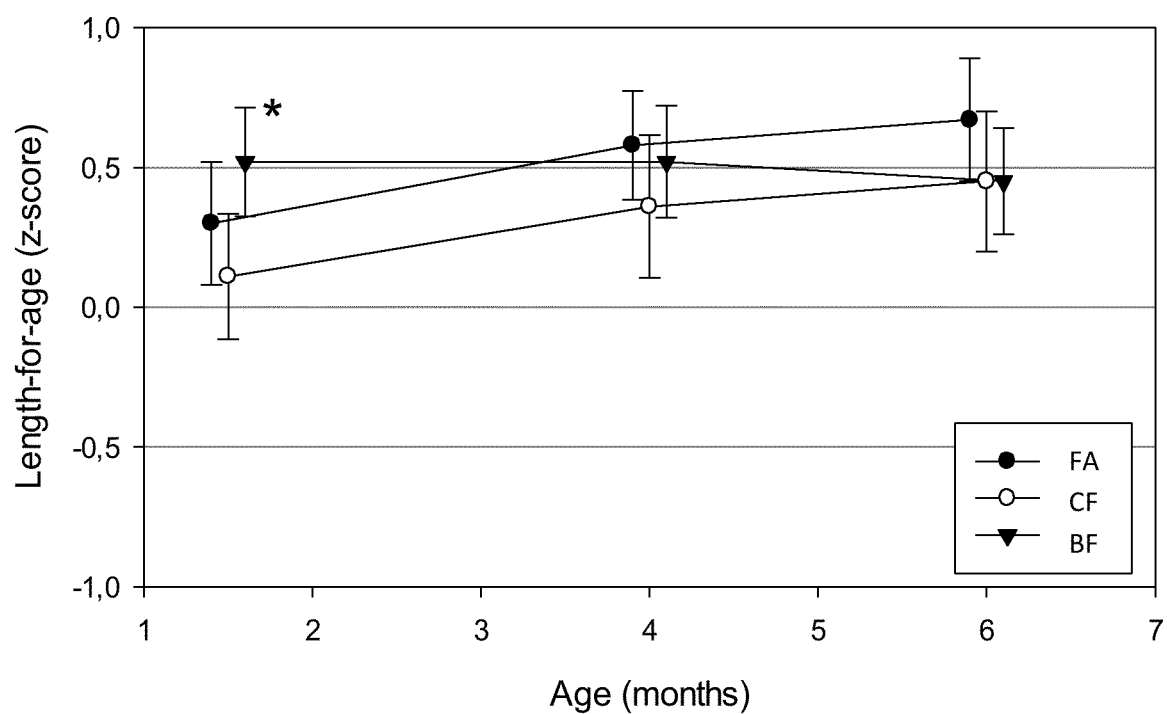
FIG. 2 is a graph illustrating the mean length-for-age (z-scores) by age for the groups of Formula A (FA), control formula (CF), and breast-fed (BF) groups.
Figure 3:
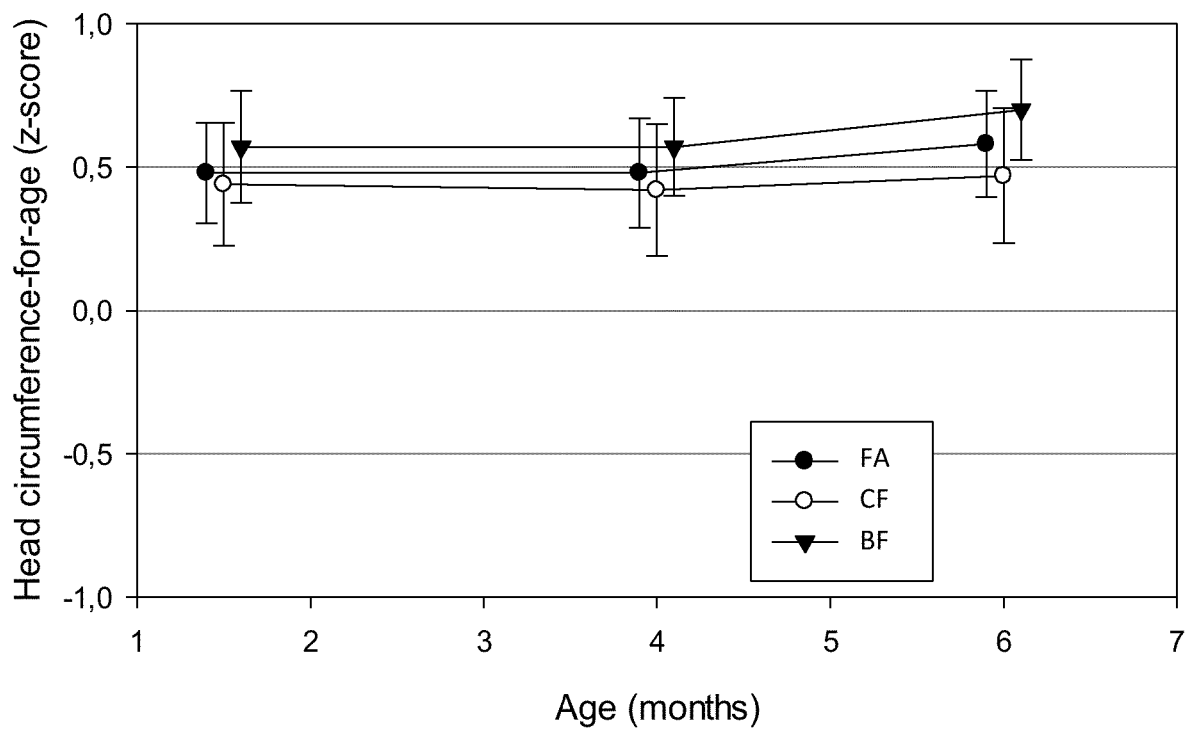
FIG. 3 is a graph illustrating the mean head circumference-for-age (z-scores) by age for the groups of Formula A (FA), control formula (CF), and breast-fed (BF) groups.
Figure 4:
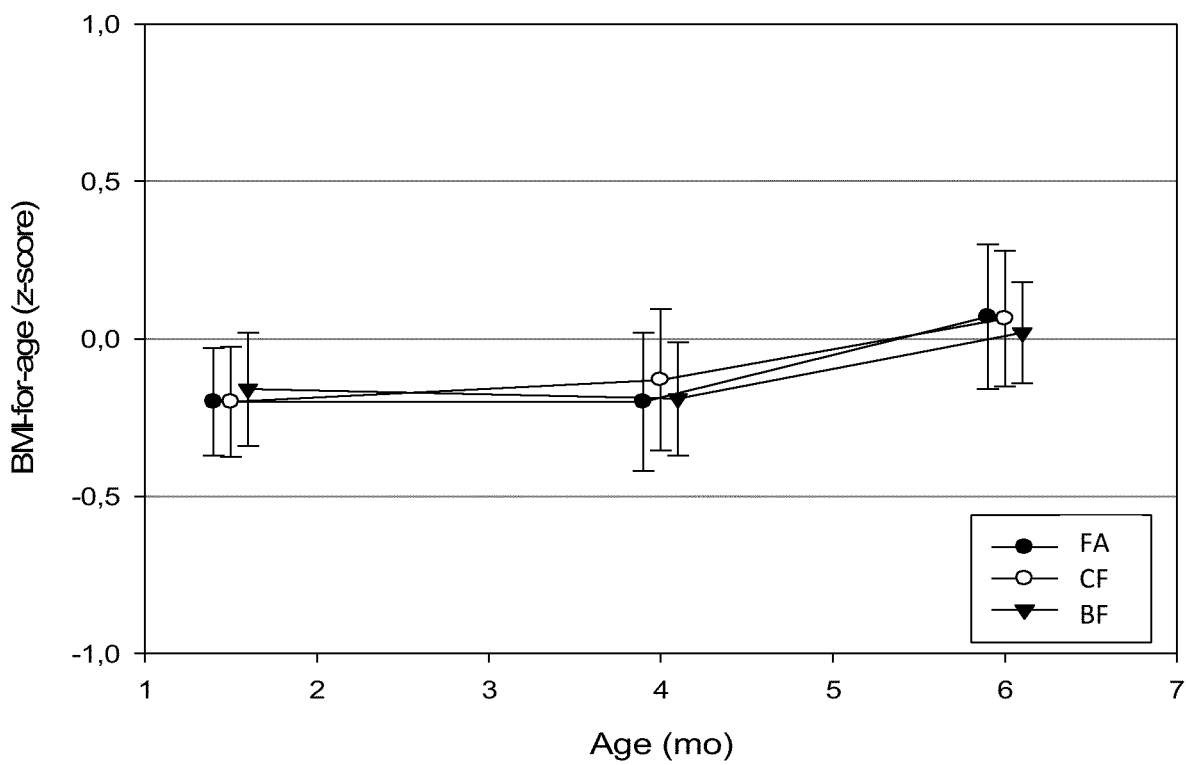
FIG. 4 is a graph illustrating the mean body mass index (BMI)-for-age (z-scores) by age for the groups of Formula A (FA), control formula (CF), and breast-fed (BF) groups.

There were no differences in age-adjusted z-scores for weight (FIG. 1), length (FIG. 2), head circumference (FIG. 3) or body mass index (FIG. 4), between the Formula A group and the breast fed group or between the Formula A and the control formula group up to 6 months of age.

In earlier studies it is consistently shown that the weight at a certain age is higher for formula fed infants compared to breast fed infants.

Nor were there differences in body fat % between the Formula A and the breast fed group or the Formula A and the Control Formula groups, cf Table 1.

TABLE 1

| Body composition (% fat) | Formula A (FA) | Control formula (CF) | Breast fed (BF) | p (adjusted p[1]) FA vs CF | p BF vs FA + CF |
|---|---|---|---|---|---|
| Baseline | 20.6 ± 4.5 | 21.2 ± 4.3 | 21.6 ± 4.1 | 0.43 (0.22) | 0.26 |
| 4 months | 26.4 ± 4.4 | 26.3 ± 4.7 | 26.5 ± 3.9 | 0.91 (0.68) | 0.78 |

[1] = adjusted for weight gain during pregnancy, gestational diabetes, parental BMI and age at inclusion Plasma Amino Acid Levels The levels of the plasma amino acids were within a satisfied range table 2 and show that the lower level of protein per 100 ml fulfil the need of a growing infant. Normally tryptophane is the limiting amino acid in infant formula. However, it was shown that the plasma level of tryptophane in this study was not different between the Formula A group and the breast fed group.

Although the Formula A contains cGMP, which has a higher level of threonine, the results show that the plasma level of threonine in Formula A fed infants was in an accepted range.

TABLE 2

Mean levels of plasma amino acids in Formula A (FA), control formula (CF) and breast-fed (BF) groups (μmol/ml), n = 20 in each group.

|  | Baseline | | | 4 months | | | 6 months | | |
|---|---|---|---|---|---|---|---|---|---|
|  | FA | CF | BF | FA | CF | BF | FA | CF | BF |
| Essential | | | | | | | | | |
| Isoleucine | 0.76[ab] | 0.84[a] | 0.66[b] | 0.74[a] | 0.90[b] | 0.66[a] | 0.76[a] | 0.74[ab] | 0.61[b] |
| Leucine | 0.121 | 0.130 | 0.122 | 0.111 | 0.130 | 0.113 | 0.119[a] | 0.110[ab] | 0.097[b] |
| Lysine | 0.21[ab] | 0.22[a] | 0.18[b] | 0.19[a] | 0.20[a] | 0.16[b] | 0.17[a] | 0.17[a] | 0.14[b] |
| Methionine | 0.031[a] | 0.032[a] | 0.025[b] | 0.025[a] | 0.025[a] | 0.018[b] | 0.019 | 0.018 | 0.016 |
| Phenylalanine | 0.057[ab] | 0.060[a] | 0.051[b] | 0.053[ab] | 0.057[a] | 0.050[b] | 0.056 | 0.057 | 0.052 |
| Threonine | 0.23 | 0.25 | 0.14 | 0.20[a] | 0.22[a] | 0.14[b] | 0.17[a] | 0.18[a] | 0.13[b] |
| Tryptophan | 0.123 | 0.094 | 0.114 | 0.089 | 0.110 | 0.098 | 0.096 | 0.095 | 0.081 |
| Valine | 0.21[a] | 0.22[a] | 0.17[b] | 0.19[a] | 0.22[b] | 0.17[a] | 0.21[a] | 0.20[ab] | 0.17[b] |
| Non-essential | | | | | | | | | |
| Alanine | 0.40 | 0.45 | 0.36 | 0.40[a] | 0.44[b] | 0.39[a] | 0.38 | 0.38 | 0.35 |
| Arginine | 0.68 | 0.83 | 0.81 | 0.79 | 0.90 | 0.82 | 0.78 | 0.95 | 0.76 |
| Asparagine | 0.26 | 0.54 | 0.22 | 0.29[ab] | 0.32[a] | 0.24[b] | 0.26 | 0.24 | 0.21 |
| Aspartic | 0.29[ab] | 0.33[a] | 0.24[b] | 0.23[a] | 0.28[b] | 0.22[a] | 0.23[ab] | 0.28[a] | 0.22[b] |
| Glutamic | 0.44[a] | 0.45[a] | 0.55[b] | 0.34[a] | 0.36[ab] | 0.40[b] | 0.31[a] | 0.32[ab] | 0.37[b] |
| Glutamine | 0.24 | 0.20 | 0.21 | 0.46 | 0.42 | 0.49 | 0.43 | 0.38 | 0.37 |
| Glycine | 0.25 | 0.25 | 0.23 | 0.23 | 0.22 | 0.21 | 0.22 | 0.21 | 0.19 |
| Histidine | 0.101 | 0.099 | 0.094 | 0.089 | 0.092 | 0.088 | 0.086 | 0.081 | 0.085 |
| Proline | 0.20 | 0.23 | 0.20 | 0.17[a] | 0.22[b] | 0.22[b] | 0.18 | 0.21 | 0.20 |
| Serine | 0.15 | 0.17 | 0.16 | 0.16 | 0.17 | 0.18 | 0.14 | 0.15 | 0.14 |
| Tyrosine | 0.088 | 0.091 | 0.090 | 0.083 | 0.082 | 0.076 | 0.080[a] | 0.076[ab] | 0.062[b] |

Statistical test with ANOVA (IBM SPSS Statistics 19), differences are considered significant at a level of $p<0.05$ after Bonferroni post hoc test for multiple comparisons ([a] differs from [b]).

Cognitive Performance

In the preliminary analysis, 70, 64 and 71 infants have been tested with Bayley Scales of Infant and Toddler Development-III at 12 months in the Formula A, Control Formula and breast fed groups, respectively. It was found that infants fed the Formula A had a higher cognitive score at 12 months compared to infants fed the Control Formula, table 3. The Formula A fed infants had a cognitive score similar to the breast fed infants. The magnitude of the difference between the groups is well in line with a meta-analysis of studies on cognitive function in formula fed compared to breast fed infants This implies that one or several factors in Formula A are needed for optimal cognitive development and that those factors can reduce the differences in cognitive function observed between breast-fed and formula-fed infants.

TABLE 3

Bayley-III composite score (mean ± SD) at 12 months for the Formula A (FA), Control formula (CF) and breast fed (BF) groups.

|  | FA | CF | BF | p-value (FA vs CF) | p-value (FA vs BF) |
| --- | --- | --- | --- | --- | --- |
| Cognitive | 105.9 ± 9.2 | 101.8 ± 8.0 | 106.4 ± 9.5 | 0.007 | 0.73 |
| Motor | 98.7 ± 9.3 | 98.2 ± 9.0 | 100.2 ± 7.2 | 0.76 | 0.25 |
| Verbal | 102.6 ± 10.5 | 102.5 ± 8.9 | 106.7 ± 10.7 | 0.92 | 0.022 |

Blood Lipids

There were differences in blood lipids between the Formula A and Control Formula groups. The Formula A contained a higher level of cholesterol than the Control formula which also resulted in higher level of plasma cholesterol in Formula A fed infants which also was similar to the breast fed group. Longer follow-up is needed, to have more clear interpretations on programming effects of this early intervention on future risk for cardiovascular disease. There are no differences in plasma triglycerides levels between Formula A, Control Formula and breast fed groups.

Cholesterol

Both the Formula A and the Control Formula used in the study contained a higher than normal level of cholesterol. The control formula 40 mg/l and the Formula A 80 mg/l. The cholesterol level in breast milk is often said to contain about 120 mg/l, but is dependant of many factors. Most standard infant formula contains less than 10 mg/of cholesterol.

The cholesterol level in the Formula A was increased by using a recipe containing milk cream, milk protein fractions containing MFGM (milk fat globule membrane) and other milk protein fractions containing cholesterol. The acquired level of cholesterol, 80 mg/l, has previously only been reached by adding pure cholesterol, lard or egg preparations.

The control formula used in this study contained 40 mg/l of cholesterol. The recipe used contained milk cream and some milk protein preparations that contained cholesterol.

In previous performed studies breast fed infants have a higher plasma cholesterol level than formula fed infants. This is especially seen during the first 6 months of life. After that there is a diminished difference in plasma cholesterol levels between breast fed and formula fed infants.

The results from this study show that, by increasing the cholesterol level in the Formula A by incorporating various cholesterol containing milk products into the product, we have managed to reach a plasma cholesterol level at 6 months similar to the group that was breast fed. Breast fed 2.20 plus/minus 0.55 and Formula A group 1.99 plus/minus 0.55. This was achieved in spite of a much lower base line plasma cholesterol level in the Formula A group in comparison with the breast fed group. These differences in the base line levels might be due to that the infants in this group, before entering the study had consumed an infant formula with a low level of cholesterol.

The infants, who consumed the control formula did not reach a plasma cholesterol at 6 months, similar to the breast fed group. However it is important to observe that the control formula used in this study contained higher level of cholesterol than most formula on the market.

Breast fed infants had a higher ratio of LDL/HDL than both infant formula groups at 6 months. But this difference was already seen at the baseline. There was no difference between the groups regarding plasma tri glyceride levels.

Other Metabolic Parameters

Plasma analyses show that important metabolic compounds such as myo-inositol in formula A fed infants were similar to breast fed infants, but significantly different from control formula fed infants.

Dietary Intake

The finding in the present study that energy intake regulation of formula-fed infants occur even at a modest (9%) difference in energy density, has not been shown previously. It can be concluded that infants fed with Formula A had a growth similar to breast fed infants.

CONCLUSION

Although the Formula A had a lower energy content and lower protein content per 100 ml, than the control formula (CF), which represents a standard formula of high quality, the results show that the composition of the Formula A fulfil the requirements for growth and body composition of an Formula A fed infant in the same way as breastfed infants. There were no differences in age-adjusted z-scores for weight, height, head-circumference or BMI between the Formula A and the breast fed groups or between the Formula A and the Control formula fed groups. Nor were there differences in body fat % between the Formula A and the breast fed groups or the Formula A and the Control formula fed groups. The Formula A with its low protein level also met the requirements for adequate growth and metabolism of infants.

Further the results from this study show that, by increasing the cholesterol level in the Formula A, by incorporating various cholesterol containing milk products into the product, we have managed to reach a plasma cholesterol level at 6 months substantially the same as for the group that was breast fed.

It was also found that infants fed the Formula A had a higher cognitive score at 12 months compared to infants fed the Control Formula. The Formula A fed infants had a cognitive score similar to the breast fed infants. The magnitude of the difference between the Formula A and the Control Formula groups is well in line with a meta-analysis of studies on cognitive function in formula fed compared to breast fed infants. This implies that one or several factors in Formula A are needed for optimal cognitive development and that those factors can reduce the differences in cognitive function observed between breast-fed and formula-fed infants.

Further this study showed that the maternal control effect, which has been seen earlier in studies, did not affect the intake of energy in the study infants, on the contrary the infants were able to regulate the intake of the volume of the formula and thus also the energy intake from both Formula A as well as from the Control Formula in order to grow similar as breast fed infants.

The invention claimed is:

1. A nutritional composition, as a ready-to-use product or a ready-to-use product reconstituted with water from a dry powder, wherein the total energy content is from 60 kcal/100 ml to 67 kcal/100 ml and the composition comprises:
   a protein content of 1.1 to 1.2 g/100 ml,
   an energy content from protein of 7.2-8.4 percentage of the total energy content of the nutritional composition,
   an energy content from fat of 49 to 53 percentage of the total energy content of the nutritional composition,
   a medium chain fatty acid content comprising 8 to 10 carbons of 0.5 to 2 weight % of a total amount of fatty acids,
   a milk-derived sialic acid content of 10-25 mg/100 ml, wherein between 1.5-5 weight % of the total sialic acid content is lipid bound sialic acid as gangliosides, and wherein at least a portion of the sialic acid content is derived from casein-glyco-macropeptide (cGMP),
   a milk-derived cholesterol content of 5-10 mg/100 ml,
   whey protein concentrate solids, wherein the whey protein concentrate solids comprise at least 20 weight % phospholipids based on a total lipid content of the whey protein concentrate solids, and wherein the whey protein concentrate solids are present in an amount of 5.35 g/L to 6.27 g/L, inclusive,
   a milk-derived sphingomyelin content of 9-15 mg/100 ml, and
   a non-protein nitrogen (NPN) value of 0.015-0.020 g/100 ml,
   wherein the protein is non-human protein, and
   wherein when the nutritional composition is orally delivered to an infant as an infant formula, the infant achieves a cognitive development score that is within 3% of the score of breast-fed infants, as measured at 12 months by the Bayley Scales of Infant and Toddler Development-III.

2. A nutritional composition according to claim 1, wherein the total energy content is 60 kcal/100 ml and the composition comprises:
   a protein content which is 1.2 g/100 ml,
   an energy content from protein of 8% of the total energy content of the nutritional composition,
   an energy content from fat of 52.5% of the total energy content of the nutritional composition,
   a medium chain fatty acid content comprising 8 to 10 carbons which is 1.6 weight % of total amount of fatty acids,
   a milk-derived sialic acid content of 19 mg/100 ml, wherein 4 weight % of the total sialic acid content is lipid bound sialic acid as gangliosides,
   a milk-derived cholesterol content of 8 mg/100 ml, and
   a milk-derived sphingomyelin content of 13 mg/100 ml.

3. The nutritional composition according to claim 1, comprising:
   a protein content of 2 g/100 kcal,
   an energy content from protein of 8% of the total energy content,
   an energy content from fat which is 52.5% of the total energy content,
   a medium chain fatty acid content comprising 8 to 10 carbons which is 1.6 weight % of the total amount of fatty acids,
   a milk-derived sialic acid content of 32 mg/100 kcal,
   a milk-derived cholesterol content of 13 mg/100 kcal, and
   a milk-derived sphingomyelin content of 22 mg/100 kcal.

4. The nutritional composition according to claim 1, wherein the protein is cow milk protein.

5. The nutritional composition of claim 1 comprising:
   sweet whey solids in an amount of 32-40 kg per 8770 L of the nutritional composition;
   sodium caseinate in an amount of 4.6-5.7 kg per 8770 L of the nutritional composition;
   skim milk solids in an amount of 66-81 kg per 8770 L of the nutritional composition;
   whey protein concentrate solids in an amount of 47-55 kg per 8770 L of the nutritional composition; and
   cream solids in an amount of 117-143 kg per 8770 L of the nutritional composition.

6. The nutritional composition of claim 5, wherein the nutritional composition comprises:
   lactose in an amount of 476-572 kg per 8770 L of the nutritional composition;
   cream solids in an amount of 123-136 kg per 8770 L of the nutritional composition;
   skim milk solids in an amount of 70.0-77.3 kg per 8770 L of the nutritional composition;
   rape seed oil in an amount of 51.6-57.0 kg per 8770 L of the nutritional composition;
   palm olein oil in an amount of 51.6-57.0 kg per 8770 L of the nutritional composition;
   whey protein solids in an amount of 49-55 kg per 8770 L of the nutritional composition;
   sunflower oil in an amount of 38.3-42.3 kg per 8770 L of the nutritional composition;
   sweet whey solids in an amount of 34.5-38.1 kg per 8770 L of the nutritional composition;
   sunflower oil HO in an amount of 24.9-27.6 kg per 8770 L of the nutritional composition;
   minerals in an amount of 16.1-17.8 kg per 8770 L of the nutritional composition;
   sodium caseinate in an amount of 4.92-5.44 kg per 8770 L of the nutritional composition;
   dry lecithin in an amount of 4.26-4.70 kg per 8770 L of the nutritional composition;
   arachidonic acid oil in an amount of 1.60-3.50 kg per 8770 L of the nutritional composition;
   docosahexaenoic acid oil in an amount of 1.60-2.17 kg per 8770 L of the nutritional composition;
   vitamins in an amount of 1.29-1.43 kg per 8770 L of the nutritional composition; and
   a combination of choline, taurine, myo-inositol, and L-carnitine in an amount of 1.21-1.34 kg per 8770 L of the nutritional composition.

7. The nutritional composition of claim 6, consisting of:
   water;
   lactose in an amount of 502 kg per 8770 L of the nutritional composition;
   cream solids in an amount of 130 kg per 8770 L of the nutritional composition;
   skim milk solids in an amount of 73.7 kg per 8770 L of the nutritional composition;
   rape seed oil in an amount of 54.3 kg per 8770 L of the nutritional composition;
   palm olein oil in an amount of 54.3 kg per 8770 L of the nutritional composition;

whey protein concentrate solids in an amount of 52 kg per 8770 L/1000 kg dry powder of the nutritional composition;

sunflower oil in an amount of 40.3 kg per 8770 L of the nutritional composition;

sweet whey solids in an amount of 36.3 kg per 8770 L of the nutritional composition;

sunflower oil HO in an amount of 26.3 kg per 8770 L of the nutritional composition;

minerals in an amount of 17.0 kg per 8770 L of the nutritional composition;

sodium caseinate in an amount of 5.18 kg per 8770 L of the nutritional composition;

dry lecithin in an amount of 4.48 kg per 8770 L of the nutritional composition;

arachidonic acid oil in an amount of 3.33 kg per 8770 L of the nutritional composition;

docosahexaenoic acid oil in an amount of 2.07 kg per 8770 L of the nutritional composition;

vitamins in an amount of 1.38 kg per 8770 L of the nutritional composition; and a mixture of choline, taurine, myo-inositol, and L-carnitine in an amount of 1.27 kg per 8770 L of the nutritional composition.

8. The nutritional composition of claim 7, wherein the minerals comprise:

potassium citrate in an amount of 4.68 kg per 8770 L of the nutritional composition;

calcium carbonate in an amount of 3.33 kg per 8770 L of the nutritional composition;

potassium chloride in an amount of 3.08 kg per 8770 L of the nutritional composition;

calcium hydrogenphosphate in an amount of 1.94 kg per 8770 L of the nutritional composition;

magnesium sulphate in an amount of 1.78 kg per 8770 L of the nutritional composition;

sodium chloride in an amount of 1.40 kg per 8770 L of the nutritional composition;

sodium citrate in an amount of 0.500 kg per 8770 L of the nutritional composition;

ferrous sulphate in an amount of 0.178 kg per 8770 L of the nutritional composition;

zinc sulphate in an amount of 0.0863 kg per 8770 L of the nutritional composition;

copper sulphate in an amount of 0.00846 kg per 8770 L of the nutritional composition;

potassium iodide in an amount of 0.00073 kg per 8770 L of the nutritional composition; and sodium selenite in an amount of 0.00039 kg per 8770 L of the nutritional composition.

9. The nutritional composition of claim 7, wherein the vitamins comprise:

ascorbic acid in an amount of 1.08 kg per 8770 L of the nutritional composition;

ascorbyl palmitate in an amount of 0.0782 kg per 8770 L of the nutritional composition;

vitamin D3 in an amount of 0.0539 kg per 8770 L of the nutritional composition;

vitamin A in an amount of 0.0476 kg per 8770 L of the nutritional composition;

DL-a-tocopherol in an amount of 0.0350 kg per 8770 L of the nutritional composition;

calcium D-pantothenate in an amount of 0.0296 kg per 8770 L of the nutritional composition;

niacin in an amount of 0.0180 kg per 8770 L of the nutritional composition;

thiamine hydrochloride in an amount of 0.00676 kg per 8770 L of the nutritional composition;

vitamin K1 in an amount of 0.00561 kg per 8770 L of the nutritional composition;

pyridoxine hydrochloride in an amount of 0.00546 kg per 8770 L of the nutritional composition;

folic acid in an amount of 0.00062 kg per 8770 L of the nutritional composition; and biotin in an amount of 0.00011 kg per 8770 L of the nutritional composition.

10. The nutritional composition of claim 7, wherein the mixture of choline, taurine, myo-inositol, and L-carnitine comprises:

choline chloride in an amount of 0.648 kg per 8770 L of the nutritional composition;

taurine in an amount of 0.415 kg per 8770 L of the nutritional composition;

myo-inositol in an amount of 0.135 kg per 8770 L of the nutritional composition; and L-carnitine in an amount of 0.0756 kg per 8770 L of the nutritional composition.

11. The nutritional composition according to claim 1, wherein the whey protein concentrate solids comprise 25-55 weight % phospholipids based on a total lipid content of the whey protein concentrate solids.

12. The nutritional composition according to claim 1, wherein the whey protein concentrate solids comprise lactoferrin, a-lactalbumin, butyrophilin, MUCi, PAS6/7 (lactadherin), gangliosides, CD14, TLR1 and TLR4, IgG, cGMP, sialic acid, sphingomyelin, phosphatidyl choline, phosphatidyl serine and phosphatidyl ethanolamine.

13. The nutritional composition according to claim 1, comprising 12-15% cream solids expressed as the percentage of the total weight of the solids in the composition.

14. A method of using the nutritional composition according to claim 1, comprising orally delivering the nutritional composition to a user as an infant formula or as a follow on formula.

15. A method of using the nutritional composition according to claim 1, comprising orally delivering the nutritional composition to a user to achieve a cognitive development score that is within 3% of the score of breast-fed infants, as measured at 12 months by the Bayley Scales of Infant and Toddler Development-III.

16. A nutritional composition, as a ready-to-use product or a ready-to-use product reconstituted with water from a dry powder, wherein the total energy content is 60 kcal/100 ml and the composition comprises:

a protein content which is 1.2 g/100 ml;

an energy content from protein of 8% of the total energy content of the nutritional composition, wherein the protein is cow milk protein;

an energy content from fat of 52.5% of the total energy content of the nutritional composition;

a medium chain fatty acid content comprising 8 to 10 carbons which is 1.6 weight % of a total amount of fatty acids;

a milk-derived sialic acid content of 19 mg/100 ml, wherein 4 weight % of the total sialic acid content is lipid bound sialic acid as gangliosides, and wherein at least a portion of the sialic acid content is derived from casein-glyco-macropeptide (cGMP);

a milk-derived cholesterol content of 8 mg/100 ml;

whey protein concentrate solids, wherein the whey protein concentrate solids comprise at least 20 weight % phospholipids based on a total lipid content of the whey protein concentrate solids, and wherein the whey protein concentrate solids are present in an amount of 5.35 g/L to 6.27 g/L, inclusive;

a milk-derived sphingomyelin content of 13 mg/100 ml; and a non-protein nitrogen (NPN) value of 0.015-0.020 g/100 ml, wherein when the nutritional composition is orally delivered to an infant as an infant formula, the infant achieves a cognitive development score that is within 3% of the score of breast-fed infants, as measured at 12 months by the Bayley Scales of Infant and Toddler Development-III, and the infant achieves a growth parameter that does not differ from the growth parameter of a similar breastfed infant, wherein the growth parameter is selected from weight, length, head circumference, body mass index, and combinations thereof.

* * * * *

UNITED STATES PATENT AND TRADEMARK OFFICE
CERTIFICATE OF CORRECTION

PATENT NO. : 11,647,777 B2
APPLICATION NO. : 15/244304
DATED : May 16, 2023
INVENTOR(S) : Bo Lönnerdal et al.

It is certified that error appears in the above-identified patent and that said Letters Patent is hereby corrected as shown below:

In the Claims

Claim 7: In Column 29, Line 2, please delete "8700 L/1000 kg dry powder" and insert -- 8770 L --.

Signed and Sealed this
Eleventh Day of July, 2023

Katherine Kelly Vidal
*Director of the United States Patent and Trademark Office*